US009445114B2

(12) United States Patent
Ouedraogo et al.

(10) Patent No.: US 9,445,114 B2
(45) Date of Patent: Sep. 13, 2016

(54) METHOD AND DEVICE FOR DETERMINING SLICE BOUNDARIES BASED ON MULTIPLE VIDEO ENCODING PROCESSES

(75) Inventors: Naël Ouedraogo, Maure de Bretagne (FR); Guillaume Laroche, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 13/416,798

(22) Filed: Mar. 9, 2012

(65) Prior Publication Data

US 2012/0230397 A1   Sep. 13, 2012

(30) Foreign Application Priority Data

Mar. 10, 2011   (GB) .................................. 1104106.8

(51) Int. Cl.
*H04N 7/12* (2006.01)
*H04N 19/436* (2014.01)
*H04N 19/70* (2014.01)
*H04N 19/119* (2014.01)
(Continued)

(52) U.S. Cl.
CPC .......... *H04N 19/436* (2014.11); *H04N 19/115* (2014.11); *H04N 19/119* (2014.11); *H04N 19/13* (2014.11); *H04N 19/14* (2014.11); *H04N 19/147* (2014.11); *H04N 19/164* (2014.11); *H04N 19/174* (2014.11); *H04N 19/61* (2014.11); *H04N 19/70* (2014.11); *H04N 19/82* (2014.11)

(58) Field of Classification Search
None
See application file for complete search history.

(56) References Cited

U.S. PATENT DOCUMENTS

2003/0140347 A1* 7/2003 Varsa ................... H04N 21/236
                                                              725/90
2005/0002337 A1* 1/2005 Wang .................... H04L 1/0009
                                                              370/235

(Continued)

FOREIGN PATENT DOCUMENTS

| EP | 1672930 A2 | 6/2006 |
| WO | 2005027495 A2 | 3/2005 |
| WO | 2011017336 A1 | 2/2011 |

OTHER PUBLICATIONS

Wiegand, T., G. J. Sullivan, G. Bjontegaard, and A. Luthra, "Overview of the H.264/AVC Video Coding Standard", IEEE Transactions on Circuits and Systems for Video Technology, vol. 13, No. 7, Jul. 2003.*

(Continued)

*Primary Examiner* — William C Vaughn, Jr.
*Assistant Examiner* — Stuart Bennett
(74) *Attorney, Agent, or Firm* — Canon USA, Inc. I.P. Division

(57) ABSTRACT

A method of encoding an image of a video sequence, the image being represented by a plurality of coding units, the encoding comprising at least two different encoding processes for encoding the image wherein each encoding process introduces coding dependencies between coding units, the method comprising: determining a set of slice boundaries for each encoding process wherein the set of slice boundaries for each encoding process partitions the image into one or more slices for the respective encoding process, the one or more slices each including a set of coding units of the image between a pair of respective slice boundaries; the coding units of one slice being encoded independently of coding units of another of the slices of the respective encoding process; wherein the slice boundaries for each encoding process are defined as a function of at least one slice boundary defining parameter.

43 Claims, 10 Drawing Sheets

(51) Int. Cl.
  *H04N 19/147* (2014.01)
  *H04N 19/13* (2014.01)
  *H04N 19/115* (2014.01)
  *H04N 19/61* (2014.01)
  *H04N 19/14* (2014.01)
  *H04N 19/164* (2014.01)
  *H04N 19/174* (2014.01)
  *H04N 19/82* (2014.01)

(56) References Cited

U.S. PATENT DOCUMENTS

| | | | | |
|---|---|---|---|---|
| 2007/0074266 A1* | 3/2007 | Raveendran | ............ | H04N 5/144 725/135 |
| 2009/0003461 A1* | 1/2009 | Kwon | ................. | H04N 19/176 375/240.27 |
| 2010/0027680 A1* | 2/2010 | Segall | ................. | H04N 19/119 375/240.24 |
| 2010/0098155 A1* | 4/2010 | Demircin | ............ | H03M 7/4006 375/240.02 |

OTHER PUBLICATIONS

Zhao, J. and A. Segall, "Parallel Entrpy Decoding for High Resolution Video Coding", Visual Communications and Image Processing 2009, edited by Majid Rabbani, Robert L. Stevenson, Proc. of SPIE-IS&T Electronic Imaging, SPIE vol. 7257, 72506, 2009.*

Thomos, N., S. Argyropoulos, N. V. Boulgouris, and M. G. Strintzis, "Robust Transmission of H.264/AVC Video Using Adaptive Slice Grouping and Unequal Error Protection", 2006 IEEE International Conference on Multimedia and Expo, Jul. 2006.*

Wenger, Stephan, "H.264/AVC Over IP", IEEE Transactions on Circuits and Systems for Video Technology, vol. 13, No. 7, Jul. 2003.*

Wiegand, T., G. J. Sullivan, G. Bjonteggard, and A. Luthra, "Overview of the H.264/AVC Video Coding Standard," IEEE Transactions on Circuits and Systems for Video Technology, vol. 13, No. 7, Jul. 2004.*

Zhao, J. and A. Segall, "Parallel Entropy Decoding for High Resolution Video Coding, " Visual Communications and Image Processing 2009, edited by Majid Rabbani, RobertL. Stevenson, Proc. of SPIE-IS&T Electronic Imaging, SPIE vol. 7257, 725506, 2009.*

Thomos, N., S. Argyropoulos, N. V. Boulgouris, and M. G. Strintzis, "Robust Transmission of H.264/AVC Video Using Adaptive Slice Grouping and Unequal Error Protection," 2006 IEEE International Conference on Multimedia and Expo, Jul. 2006.*

Wenger, Stephan, "H.264/AVC Over IP," IEEE Transactions on Circuits and Systems for Video Technology, vol. 13, No. 7, Jul. 2003.*

Kumar et al. "Error resiliency schemes in H.264/AVC standard" published in Journal of Visual Communication and Image Representation, vol. 17, Issue 2, Apr. 2006, pp. 425-450.*

* cited by examiner

METHOD AND DEVICE FOR DETERMINING SLICE BOUNDARIES BASED ON MULTIPLE VIDEO ENCODING PROCESSES

CROSS-REFERENCES TO RELATED PATENT APPLICATIONS

This application claims the benefit under 35 U.S.C. §119 of the filing date of UK Patent Application No. 1104106.8, filed 10 Mar. 2011, hereby incorporated by reference in its entirety as if fully set forth herein.

FIELD OF INVENTION

The present invention concerns a method and a device for encoding image data. The invention further relates to a method and a device for decoding image data and a bitstream of video data.

DESCRIPTION OF BACKGROUND ART

Video data is typically composed of a series of still images which are shown rapidly in succession as a video sequence to give the idea of a moving image. Video applications are continuously moving towards improved image resolution (greater number of pixels per frame, higher frame rate, higher bit-depth . . . ). A large quantity of video content is distributed in digital form via broadcast channels, digital networks and packaged media, with a continuous evolution towards improved quality and resolution (e.g. higher number of pixels per frame, higher frame rate, higher bit-depth or extended colour gamut). This evolution in technology puts increased pressure on distribution networks that already face difficulties in providing HDTV resolution and data rates economically to the end user. Consequently, further increases in data rate will put additional pressure on such distribution networks. To address this challenge, ITU-T (International Telecommunications Union, telecommunications Standardization Sector) and ISO/MPEG decided to launch a new video coding standard project in January 2010, known as High Efficiency Video Coding (HEVC).

HEVC codec design is similar to that of most previous so-called block-based hybrid transform codecs such as H.263, H.264, MPEG-1, MPEG-2, MPEG-4, SVC. Video compression algorithms, such as those standardized by the standardization bodies ITU, ISO and SMPTE, use spatial and temporal redundancies of images in order to generate data bit streams of reduced size. Spatial redundancy represents the mutual correlation between adjacent image pixels, while temporal redundancy represents the correlation in image objects in sequential images. Such compression processes make the transmission and/or storage of video sequences more effective.

Video sequences encoded by HEVC are used in many applications such as streaming environments or lightweight performance devices. In order to be more robust to streaming errors and to be able to process data in parallel in lightweight devices, for example, new coding structures and rules have been added to HEVC. However, current HEVC techniques do not provide a solution that is flexible enough to respond to requirements of all of these applications efficiently.

SUMMARY OF THE INVENTION

The present invention has been devised to address one or more of the foregoing concerns.

According to a first aspect of the invention there is provided a method of determining slices for encoding an image of a video sequence, the image being represented by a plurality of coding units, the encoding comprising at least two different encoding processes for encoding the image wherein each encoding process introduces coding dependencies between coding units, the method comprising:

determining, for each encoding process, a respective set of slice boundaries wherein the set of slice boundaries for each encoding process partitions the image into one or more slices for the respective encoding process, the one or more slices each including a set of coding units of the image between a pair of respective slice boundaries and the coding units of one slice being encoded independently of the coding units of another of the slices of the encoding process concerned;

wherein the slice boundaries for each encoding process are determined as a function of at least one slice boundary defining parameter.

Dynamic flexible video processing may thus be provided. Since the slice boundary defining parameter can vary the slice boundaries may be defined according to variable conditions.

In an embodiment the at least one slice boundary defining parameter is representative of at least one of:
the characteristics of data content of the video sequence;
the characteristics of the network via which the encoded image is to be transmitted; and
the capabilities of the decoder to which the encoded image is to be transmitted.

Accordingly more flexible video processing is provided since the slice boundaries may be adapted to the application or the characteristics of the decoder capabilities, the network characteristics or the video content.

In a particular embodiment the coding dependency comprises coding dependency between coding units and the slice boundaries are defined according to the coding dependency of a coding unit on its neighbouring coding units in the image. Thus, for example a slice boundary may be introduced between coding units which have a low co-dependency, and decoding will be less prone to errors.

In an embodiment at least one of the characteristics of the network includes a packet loss rate, and wherein the number of coding units in a slice between two slice boundaries is increased if the packet loss rate falls below a predetermined threshold. Thus the error robustness can be increased if network conditions deteriorate.

In an embodiment at least one of the characteristics of the network is the maximum transport unit size of the network via which the encoded image is to be transmitted. This helps to increase the probability that the received packet will be decodable.

For example in a particular embodiment, if the packet loss rate is above a predetermined packet loss rate threshold the slice boundaries are defined such that the size of a slice between two slice boundaries is less than or equal to the size of a maximum transport unit, otherwise if the packet loss rate is less than the predetermined packet loss rate threshold the slice boundaries are defined such that the size of a slice between two slice boundaries corresponds to N times the size of a maximum transport unit size where N>1.

In an embodiment the slice boundaries are defined according to the expected error resilience level and the compression rate of the bitstream representative of the image.

In an embodiment at least one of the capabilities of the decoder is the number of decoding processes that can be run in parallel on the decoder, and in particularly the number of decoding processes that may be run in parallel for each decoding process.

In an embodiment at least one of the capabilities of the decoder includes the error concealment capability of the decoder.

In an embodiment the slice boundaries for an encoding process comprising pixel reconstruction are defined such that the surface area of the image represented by the slice is inferior to a surface area depending on the error concealment capability of the decoder.

In an embodiment at least one of the characteristics of data content of the video sequence includes a level of spatial correlation of a coding unit of the image with neighbouring coding units of the image.

In an embodiment a slice boundary is introduced at a coding unit when said level of spatial correlation for said coding unit is less than a spatial correlation threshold. For example, in an embodiment said spatial correlation threshold may correspond to a predetermined number of bits used to predict motion information from a neighbouring coding unit. In another embodiment said spatial correlation threshold may correspond to a predetermined filtering strength of the loop filters. In a further embodiment said spatial correlation threshold depends on an intra prediction mode used for encoding a coding unit.

In an embodiment at least one of the characteristics of data content of the video sequence is a level of prediction by the entropy context model defined in syntax coding parameters for the syntax coding process. For example in an embodiment a slice boundary may be introduced at a coding unit when said level prediction by the entropy context model defined in syntax coding parameters is less than a predetermined threshold.

In a particular embodiment at least two different sets of the slice boundaries are determined for at least one of the encoding process, one of the at least 2 sets of slice boundaries optimising a rate distortion minimisation criteria being selected.

According to a second aspect of the invention there is provided a bitstream of video data comprising: an encoded image, wherein the encoded image is encoded according to an encoding method in which, the image is represented by a plurality of coding units, the encoding comprising at least two different encoding processes for encoding the image wherein each encoding process introduces coding dependencies between coding units, the method comprising: determining for each encoding process a respective set of slice boundaries wherein the set of slice boundaries for each encoding process partitions the image into one or more slices for the respective encoding process, the one or more slices each including a set of coding units of the image between a pair of respective slice boundaries; wherein the slice boundaries for each encoding process are defined as a function of at least one slice boundary defining parameter.

In an embodiment the at least one slice boundary defining parameter is representative of at least one of the characteristics of data content of the video sequence, the characteristics of the network via which the encoded image is to be transmitted and the capabilities of the decoder to which the encoded image is to be transmitted.

The video bitstream may include a slice information dataset for the image including slice information defining each type of encoding process and the corresponding slice boundaries within the image for each type of encoding process.

According to a third aspect of the invention there is provided a device for determining slices of an image for encoding an image of a video sequence, the image being represented by a plurality of coding units, the encoding comprising at least two independent encoding processes for encoding the image wherein each encoding process introduces coding dependencies between coding units, the device comprising: slice boundary determining means for determining, for each encoding process, a set of slice boundaries wherein the set of slice boundaries for each encoding process partitions the image into one or more slices for the respective encoding process, the one or more slices each including a set of coding units of the image between a pair of respective slice boundaries; wherein the slice boundary determining means is operable to determine the slice boundaries for each encoding process as a function of a slice boundary defining parameter.

In an embodiment the at least one slice boundary defining parameter is representative of at least one of the characteristics of data content of the video sequence, the characteristics of the network via which the encoded image is to be transmitted and the capabilities of the decoder to which the encoded image is to be transmitted.

In an embodiment the coding dependency comprises coding dependency between coding units and the slice boundary determining means is operable to define the slice boundaries according to the coding dependency of a coding unit on its neighbouring coding units in the image.

In an embodiment at least one of the characteristics of the network includes a packet loss rate, and wherein the slice boundary determining means is operable to increase the number of coding units in a slice between two slice boundaries if the packet loss rate falls below a predetermined threshold.

In an embodiment at least one of the characteristics of the network is the maximum transport unit size of the network via which the encoded image is to be transmitted. For example, if the packet loss rate is above a predetermined packet loss rate threshold the slice boundary determining means is operable to define the slice boundaries such that the number of coding units in a slice between two slice boundaries is less than the size a maximum transport unit, otherwise if the packet loss rate is less than the predetermined packet loss rate threshold the slice boundary determining means is operable to define the slice boundaries such that the number of coding units in a slice between two slice boundaries corresponds to N times the size of a maximum transport unit size where N>1.

In an embodiment the slice boundary determining means is operable to define slice boundaries according to the error resilience level of the bitstream representative of the image.

In an embodiment at least one of the capabilities of the decoder is the number of decoding processes that can be run in parallel on the decoder for each encoding process.

In an embodiment at least one of the capabilities of the decoder includes the error concealment capability of the decoder.

In an embodiment the slice boundary determining means is operable to determine the slice boundaries for an encoding process comprising pixel reconstruction such that the surface area of the image represented by the slice is inferior to a surface area depending on the error concealment capability of the decoder.

In an embodiment at least one of the characteristics of data content of the video sequence includes a level of spatial correlation of a coding unit of the image with neighbouring coding units of the image.

In an embodiment the slice boundary determining means is operable to introduce a slice boundary at a coding unit when said level of spatial correlation for said coding unit is less than a spatial correlation threshold. For example said spatial correlation threshold may depend on a predetermined number of bits used to predict motion information from a neighbouring coding unit, a predetermined filtering strength of the loop filters, and/or an intra prediction mode used for encoding a coding unit.

In an embodiment at least one of the characteristics of data content of the video sequence is a level of prediction by the entropy context model defined in syntax coding parameters for the syntax coding process.

In an embodiment the slice boundary determining means is operable to introduce a slice boundary at a coding unit when said level prediction by the entropy context model defined in syntax coding parameters is less than a predetermined threshold.

In an embodiment at least two different sets of the slice boundaries are determined for at least one of the encoding process, one of the at least 2 sets of slice boundaries optimising a rate distortion minimisation criteria being selected.

According to a fourth aspect of the invention there is provided a method of decoding a video bitstream representative of an image of a video sequence, the image being represented by a plurality of coding units and having been encoded according to an encoding method in which, the image is represented by a plurality of coding units, the encoding comprising at least two different encoding processes for encoding the image wherein each encoding process introduces coding dependencies between coding units, the encoding method comprising: determining for each encoding process a respective set of slice boundaries wherein the set of slice boundaries for each encoding process partitions the image into one or more slices for the respective encoding process, the one or more slices each including a set of coding units of the image between a pair of respective slice boundaries; wherein the slice boundaries for each encoding process are determined as a function of a slice boundary defining parameter, the decoding method comprising decoding the bitstream according to the determined sets of slice boundaries wherein each set of slice boundaries corresponds to a decoding process and comprises one or more slices including a set of coding units, wherein the coding units of one slice are decoded independently of coding units of another of the slices for the same decoding process.

In a particular embodiment at least two of the slices of a set of slices of a respective decoding process are decoded in parallel. In another embodiment at least two of the different decoding processes are performed in parallel.

According to a fifth aspect of the invention there is provided a decoding device for decoding a video bitstream representative of an image of a video sequence, the image being represented by a plurality of coding units and having been encoded according to the encoding method described above, the decoding device comprising decoding means for decoding the bitstream according to sets of slice boundaries determined in accordance with the method described above wherein each set of slice boundaries corresponds to a decoding process and comprises one or more slices including a set of coding units, wherein the decoding means is operable to decode coding units of one slice independently of coding units of another of the slices for the same decoding process.

The decoding means may be operable to decode each of the slices of a set of slices of a respective decoding process in parallel, and/or each of the independent decoding processes in parallel.

According to another aspect of the invention there is provided a slice information dataset for use with an encoding method in which, the image is represented by a plurality of coding units, the encoding comprising at least two different encoding processes for encoding the image wherein each encoding process introduces coding dependencies between coding units, the encoding method comprising: determining for each encoding process a respective set of slice boundaries wherein the set of slice boundaries for each encoding process partitions the image into one or more slices for the respective encoding process, the one or more slices each including a set of coding units of the image between a pair of respective slice boundaries; wherein the slice boundaries for each encoding process are determined as a function of a slice boundary defining parameter, wherein the slice information dataset includes information indicating the type of each different encoding process and the corresponding slice boundaries for each set of slices within the same image.

According to a further aspect of the invention there is provided a decoding device operable to receive a slice information dataset including information indicating a plurality of different decoding processes and corresponding slice boundaries defining a set of slices within an image for each decoding process, the device being further operable to perform parallel decoding of slices according to the information in the slice information dataset.

In an embodiment the decoding device is operable to adapt the number of processing modules to be run in parallel according to the number of slices defined by the slice boundaries for each decoding process.

According to a further aspect of the invention there is provided a method of decoding an image comprising receiving a slice information dataset including information indicating a plurality of different decoding processes and corresponding slice boundaries defining a set of slices within an image for each decoding process, and performing parallel decoding of slices according to the number of slices defined by the slice boundaries for each decoding process.

According to yet another aspect of the invention there is provided a signal for carrying the slice information dataset described above.

According to yet another aspect of the invention, there is provided an encoding method in which slices of an image are defined for respective decoding processes wherein a single reconstruction slice is used for each of the regions of an image with low frequencies coding blocks and regions with high frequencies coding blocks are subdivided into several reconstruction slices in order to limit the error propagation within such areas.

According to yet another aspect of the invention, there is provided an encoding method in which slices of an image are defined for respective decoding processes wherein a single loop filter slice is defined for each smooth region of the image and textured regions of the image are subdivided into multiple loop filter slices. In an embodiment a predetermined number of CUs is attributed to each loop filter slice in textured areas.

According to yet another aspect of the invention, there is provided an encoding method in which slices of an image are defined for respective decoding processes wherein slice boundaries defining the slices are defined based on rate distortion criteria.

According to a further aspect of the invention there is provided a method of encoding an image of a video sequence, the image being represented by a plurality of coding units, the encoding comprising at least two different encoding processes for encoding the image wherein each encoding process introduces coding dependencies between coding units, the method comprising:

determining, for each encoding process, a respective set of slice boundaries wherein the set of slice boundaries for each encoding process partitions the image into one or more slices for the respective encoding process, the one or more slices each including a set of coding units of the image between a pair of respective slice boundaries and the coding units of one slice being encoded independently of the coding units of another of the slices of the encoding process concerned; wherein the slice boundaries for each encoding process are determined as a function of at least one variable slice boundary defining parameter; and encoding slices of the image in accordance with the respective encoding process.

According to a yet further aspect of the invention there is provided an encoder for encoding an image of a video sequence, the image being represented by a plurality of coding units, the encoder being operable to apply at least two independent encoding processes for encoding the image wherein each encoding process introduces coding dependencies between coding units, the encoding device comprising: slice boundary determining means for determining, for each encoding process, a set of slice boundaries wherein the set of slice boundaries for each encoding process partitions the image into one or more slices for the respective encoding process, the one or more slices each including a set of coding units of the image between a pair of respective slice boundaries; wherein the slice boundary determining means is operable to determine the slice boundaries for each encoding process as a function of a slice boundary defining parameter, the encoder comprising an encoding unit for encoding the slices of the image in accordance with the respective encoding process.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:—

DETAILED DESCRIPTION OF EMBODIMENTS OF THE INVENTION

Figure 1:
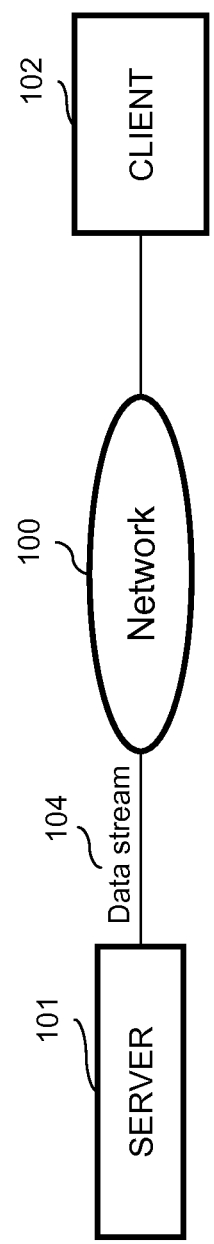
FIG. 1 is a schematic diagram of a data communication network in which one or more embodiments of the invention may be implemented.

FIG. 1 illustrates a data communication system in which one or more embodiments of the invention may be implemented. The data communication system comprises a sending device, in this case a server 101, which is operable to transmit data packets of a data stream to a receiving device, in this case a client terminal 102, via a data communication network 100. The data communication network 100 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 101 sends the same data content to multiple clients.

The data stream 104 provided by the server 101 may be composed of multimedia data representing video and audio data. Audio and video data streams may, in some embodiments, be captured by the server 101 using a microphone and a camera respectively. In some embodiments data streams may be stored on the server 101 or received by the server 101 from another data provider. The video and audio streams are coded by the server 101 in particular for them to be compressed for transmission.

In order to obtain a better ratio of the quality of transmitted data to quantity of transmitted data, the compression of the video data may be of motion compensation type, for example in accordance with the HEVC format or H.264/AVC format.

In order to transmit a video stream compressed using a HEVC type codec, the server 101 performs packetization which consists in embedding network abstract layer (NAL) units in network packets. A NAL unit is a data container containing a header and coded elements. For instance, one NAL unit may correspond to a slice composing a video frame.

The compressed data is partitioned into packets by implementation of a packetization process and transmitted to the client 102 via the network 100 using a communication protocol, for example Real-time Transport Protocol (RTP), User Datagram Protocol (UDP) or any other type of communication protocol. Three main packetization methods may be used for each network abstract layer (NAL) unit of the bitstream. In a first case, one NAL unit size is smaller than the maximum transport unit (MTU) size corresponding to the largest packet size that can be transmitted over the network without being fragmented. In such a case, the NAL unit is embedded into a single network packet. The second case occurs when multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit should be sent consecutively for decoding purposes.

The client 102 receives the packetized data and reconstitutes the NAL units from the network packet. For fragmented NAL units, the client concatenates the data from the fragmented NAL units in order to reconstruct the original NAL unit. When one of the fragmented NAL units is lost, the original NAL unit cannot be decoded and is thus discarded. The client 102 decodes the reconstructed data stream received by the network 100 and reproduces the video images on a display device and the audio data by a loud speaker. The decoding process of the client will be further described in reference to FIG. 4.

Figure 2:
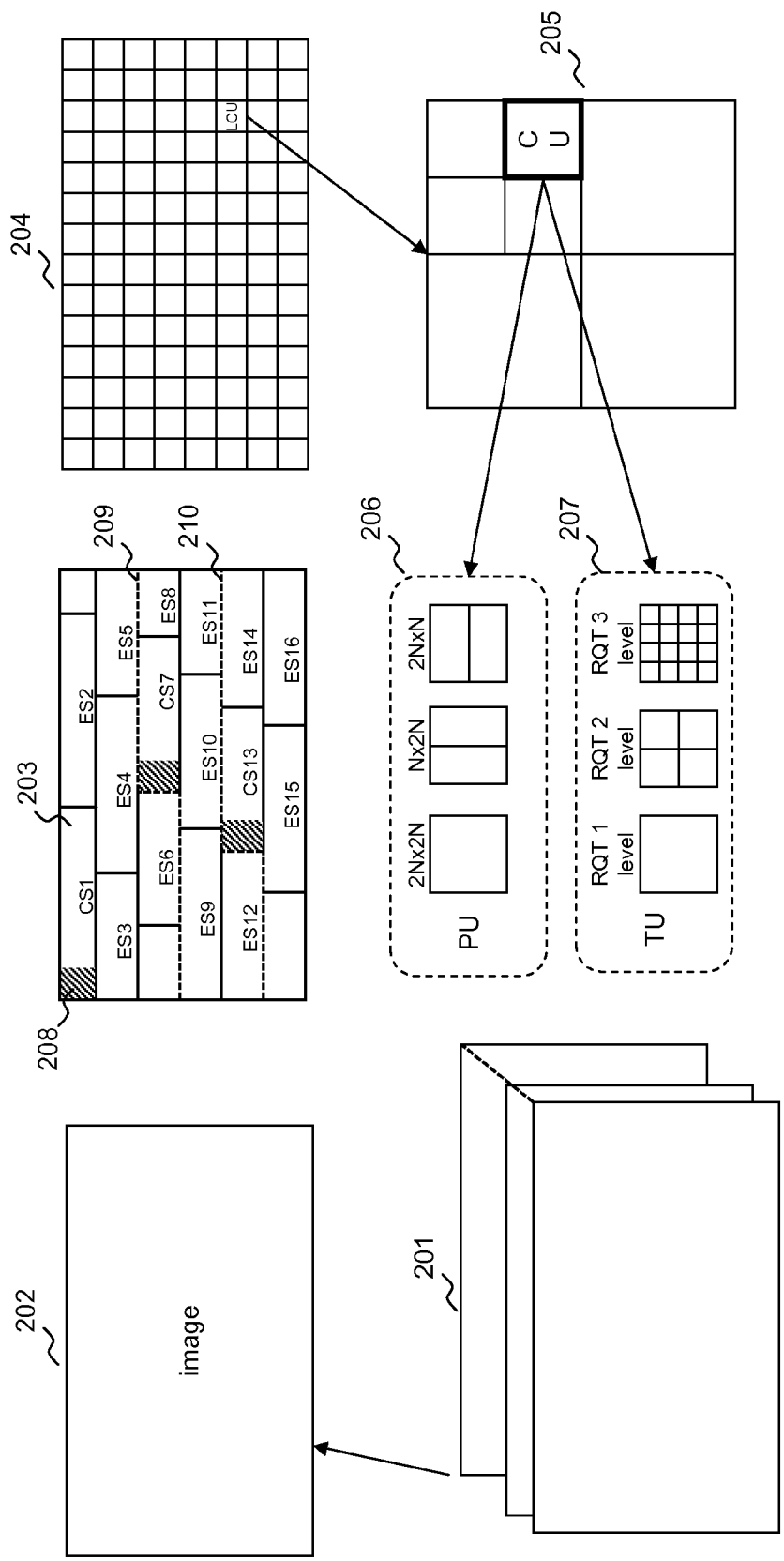
FIG. 2 is a schematic block diagram illustrating an example of an image coding structure employed in HEVC.

FIG. 2 illustrates an example of an image coding structure typically employed in HEVC. According to HEVC and one of its previous predecessors, the original video sequence 201 is composed of a succession of digital images "images i". Each digital image is represented by one or more matrices, the coefficients of which represent pixels. The images 202 can be partitioned into slices 203. A slice may correspond to a part of an image or the entire image. In HEVC these slices are divided into non-overlapping Largest Coding Units (LCUs) 204 which are generally blocks of size 64 pixels×64 pixels. Each LCU may in turn be iteratively divided into smaller variable size Coding Units (CUs) 205 using a quadtree decomposition. Coding units correspond to elementary coding elements and are constituted of two sub-units: a Prediction Unit (PU) 206 and a Transform Unit (TU) 207 which have a maximum size equal to the size of the corresponding CU. A Prediction Unit corresponds to the partition of the CU for prediction of pixels values. Each CU can be further partitioned into a maximum of 2 symmetric rectangular Partition Units 206. Transform units 207 are used to represent the elementary units that are spatially transformed by DCT (Discrete Cosine Transform). A CU can be partitioned into a TU based on a quadtree representation.

In HEVC, two kinds of slices 203 are typically used: coding slices and entropy slices. In FIG. 2 frame 203 has been divided in 16 slices: CS1, CS7 and CS13 correspond to coding slices and ES1-6, ES8-12, and ES14-16 to entropy slices. Each coding slice starts with a slice header 208 that indicates the coding parameters of the coding slice. The slices break the coding dependencies at their boundaries which are represented in FIG. 2 by dashed lines 209 and 210. Coding units of one slice are thus encoded or decoded independently of coding units of another slice: i.e. there are no coding dependencies such as prediction dependencies between coding units of two different slices. Thus, the CUs of slice CS7 cannot use the CUs pixels of slice ES4 for intra prediction. An entropy slice allows syntax decoding of the bitstream independently of other entropy slices. The coding parameters of entropy slices are those of the most recent coding slice in raster scan order. To achieve such functionality, each entropy slice resets the entropy context and considers neighbourhood data outside the entropy slice as unavailable. Thus, entropy slice enables syntax information of the bitstream to be decoded in parallel. For instance, entropy slices ES2, ES3 and ES4 can be decoded in parallel. In HEVC, entropy slices and coding slices are typically represented by different NAL units.

The coding parameters of the video sequence are stored in dedicated NAL units called parameter sets. In HEVC and H.264/AVC two kinds of parameter sets NAL units are employed. The first kind known as a Sequence Parameter Set (SPS) NAL unit that includes parameters that are unchanged during the entire video sequence. Typically, an SPS handles the coding profile, the size of the video frames and other parameters. The second kind known as a Picture Parameter Set (PPS) which codes the different values that may change from one image to another.

Figure 3:
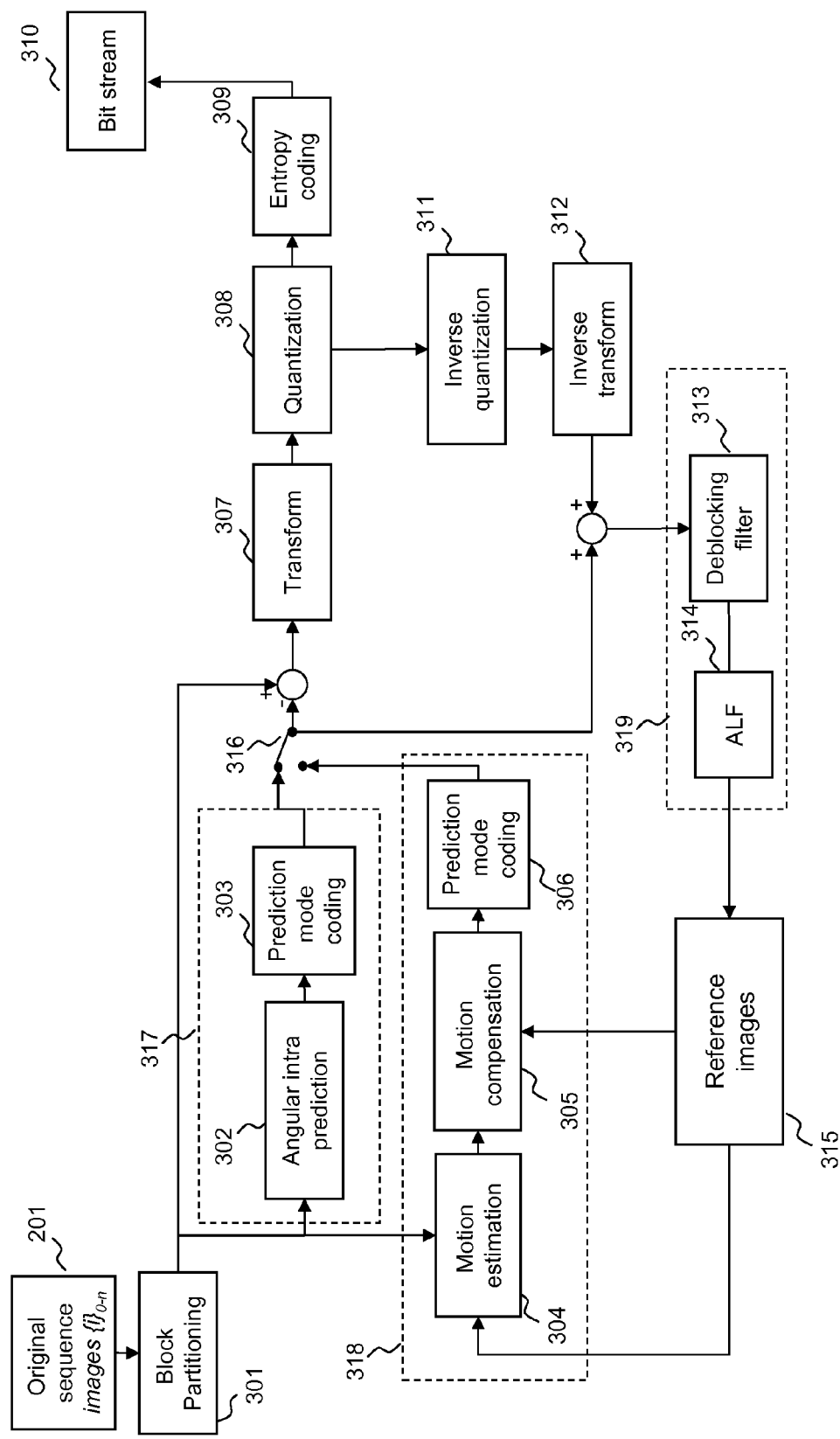
FIG. 3 is a schematic block diagram illustrating modules of an exemplary HEVC encoder.

FIG. 3 schematically illustrates an exemplary HEVC video encoder 30. Each frame of the original video sequence 201 is first divided into a grid of coding units (CU) during stage 301 and coding slices and entropy slices are defined. In general, two methods define slice boundaries by either defining a given number of CUs per slices (entropy or coding slices) or a given number of bytes per slice. The subdivision of an LCU into CUs and the partitioning of a CU into TUs and PUs are determined based on a rate distortion criterion. Each PU of the CU being processed is predicted spatially by an "Intra" predictor 317, or temporally by an "Inter" predictor 318. Each predictor is a block of pixels issued from the same image or another image, from which a difference block (or "residual") is derived. By identifying a predictor block and coding the residual, it is possible to reduce the actual quantity of information to be encoded.

The encoded images can be of two types: temporal predicted images which can be either predicted from one or more reference images in one direction are called P-frames or predicted from at least two reference frames in two directions (forward and backward) are called B-frames; and non-temporal predicted frames called Intra frames or I-frames. In I-frames, only Intra prediction is considered for coding CUs/PUs. In P-frames and B-frames, Intra and Inter prediction are considered for coding CUs/PUs.

In the "Intra" prediction processing module 317, the current block is predicted by means of an "Intra" predictor which corresponds to a block of pixels constructed from the information of the current image already encoded. The module 302 determines an angular prediction direction that is used to predict pixels of a current PU to encode from neighbouring PUs pixels. In HEVC, up to 34 directions can be considered. A residual PU is obtained by computing the difference between the intra predicted PU and current PU of pixels. An intra-predicted PU therefore comprises a prediction direction with a residual. The coding of the intra prediction direction is partly inferred from the prediction direction of neighbouring prediction units. This inferring process 303 of prediction direction enables the coding rate of the intra prediction direction mode to be reduced. The Intra prediction processing module 317 also uses the spatial dependencies of the frame for predicting the pixels and for inferring the intra prediction direction of the prediction unit.

With regard to the second processing module 318 that is "Inter" coding, two prediction types are possible. Mono-prediction (P-type) entails predicting the PU by referring to one reference area from one reference picture. Bi-prediction (B-type) entails predicting the PU by referring to two reference areas from one or two reference pictures. In HEVC, B-type frames have been generalized and replace P-type frames which now predict the PU by referring to two reference areas in one reference picture. An estimation of motion 304 between the current PU and reference images 315 is made in order to identify, in one or several of these reference images, one (for P-type) or several (for B-type) areas of pixels to use them as predictors of this current PU. In the case where several areas predictors are used (B-type), they are merged to generate one single prediction. The reference images are images in the video sequence that have already been coded and then reconstructed (by decoding).

The reference area is identified in the reference frame by a motion vector that is equal to the displacement between the PU in current frame and the reference area. The next stage 305 of the inter prediction process involves computing the difference between the prediction area and the current PU. This difference is the residual of the inter predicted PU. At the end of the inter prediction process the current PU is composed of one motion vector and a residual.

By virtue of spatial dependencies of movement between neighbouring PUs, HEVC provides a method to predict the motion vectors of each PU. Several motion vector predictors are employed: typically, the motion vector of the PU localized on the top of, the left of or the top left corner of the current PU are a first set of spatial predictors. One temporal motion vector candidate is also used that is the one of the collocated PU (i.e. the PU at the same coordinate) in a reference frame. The coder then removes predictors that are equal within the set of candidates. It selects one of the predictors based on a criterion that minimizes the difference between the MV predictor and that of the current PU. In HEVC, this process is referred to as Advanced Motion Vector Prediction (AMVP). Finally, the current PU's motion vector is coded 306 with an index that identifies the predictor within the set of candidates and a MV difference MVD of PU's MV with the selected MV candidate. The inter prediction processing module also relies on spatial dependencies between motion information of prediction units to increase the compression ratio of inter predicted coding units. For entropy slices, an AMVP process neighbouring PUs are considered as unavailable if they do not belong to the same slice.

These two types of codings thus supply several texture residuals (the difference between the current PU and the predictor), which are compared in a module 316 for selecting the best coding mode.

The residual obtained at the end of an inter or intra prediction process is then transformed in module 307. The transform applies to a Transform Unit TU that is included in a CU. A TU can be further split into smaller TUs using a so-called Residual QuadTree (RQT) decomposition 207. In HEVC, generally 2 or 3 levels of decompositions are used and authorized transform sizes are from 32×32, 16×16, 8×8 and 4×4. The transform basis is derived from a discrete cosine transform DCT.

The residual transformed coefficients are then quantized 308. The coefficients of the quantized transformed residual are then coded by means of an entropy coding process 309 and then inserted into the compressed bit stream 310. Coding syntax elements are also coded by entropy encoding 309. This processing module uses spatial dependencies between syntax elements to increase the coding efficiency.

In order to calculate the "Intra" predictors or to make an estimation of the motion for the "Inter" predictors, the encoder performs a decoding of the PUs already encoded by means of a so-called "decoding" loop 311, 312, 313, 314, 315. This decoding loop makes it possible to reconstruct the PUs and images from the quantized transformed residuals.

Thus the quantized transformed residual is dequantized 311 by applying the inverse quantization to that provided at quantization step 308 and reconstructed 312 by applying the inverse transform to that of the step 307.

If the residual comes from an "Intra" coding process 317, the used "Intra" predictor is added to this residual in order to recover a reconstructed PU corresponding to the original PU modified by the losses resulting from a transformation with loss, for example in this case the quantization operations.

If on the other hand the residual comes from an "Inter" coding 318, the areas pointed to by the current motion vectors (these areas belong to the reference images 315 referred by the current image indices) are merged then added to this decoded residual. In this way the original PU is modified by the losses resulting from the quantization operations.

A final loop filter processing module 319 is applied to the reconstructed signal in order to reduce the effects created by heavy quantization of the residuals obtained and to improve the signal quality. The loop filter processing module comprises two steps, a "deblocking" filter and a linear filtering. The deblocking filter 313 smoothes the borders between the PUs in order to visually attenuate the high frequencies created by the coding. Such a filter being known to a skilled person, it will not be described in any further detail here. The linear filtering 314 Adaptive Loop Filter (ALF) further improves the signal using filter coefficients adaptively determined. The coefficients of the filter are computed in order to minimize the sum of square difference (SSD) with the original image. The coefficients of the filters are coded and transmitted in one header of the bitstream typically a picture or slice header. The filter 319 is thus applied to an image when all the PUs of pixels of the image have been decoded. The filtering process is performed on a frame by frame basis and uses several pixels around the pixel to be filtered. This processing module 319 also uses spatial dependencies between pixels of the frame.

The filtered images, also known as reconstructed images, are then stored as reference images 315 in order to allow the subsequent "Inter" predictions taking place during the compression of the subsequent images of the current video sequence.

In the context of HEVC, it is possible to use several reference images 315 for the estimation and motion compensation of the current image. In other words, the motion estimation is carried out on N images. Thus the best "Inter" predictors of the current PU, for the motion compensation, are selected in some of the multiple reference images. Consequently two adjoining PUs may have two predictor PUs that come from two distinct reference images. This is particularly the reason why, in the compressed bit stream, the index of the reference image (in addition to the motion vector) used for the predictor area is indicated.

The use of multiple reference images, in particular where the number of reference images is limited to 4, is both a tool for resisting errors and a tool for improving the compression efficacy.

The encoder is embedded in a server such as the server 101 of FIG. 1 for streaming purposes and therefore slices may be employed for error resilience. For instance, the number of coding slices is set to a predetermined number (e.g. 8 slices per frame for 1920×1080 resolution) in order to limit the error propagation within a frame. Entropy slices are used to enable parallel processing on the decoder side. The coding process presented previously is also adapted to respect coding and entropy slices characteristics as described with reference to FIG. 2. The resulting bitstream 310 is also composed of a set of NAL units corresponding to parameter sets, coding slices and entropy slices.

Figure 4:
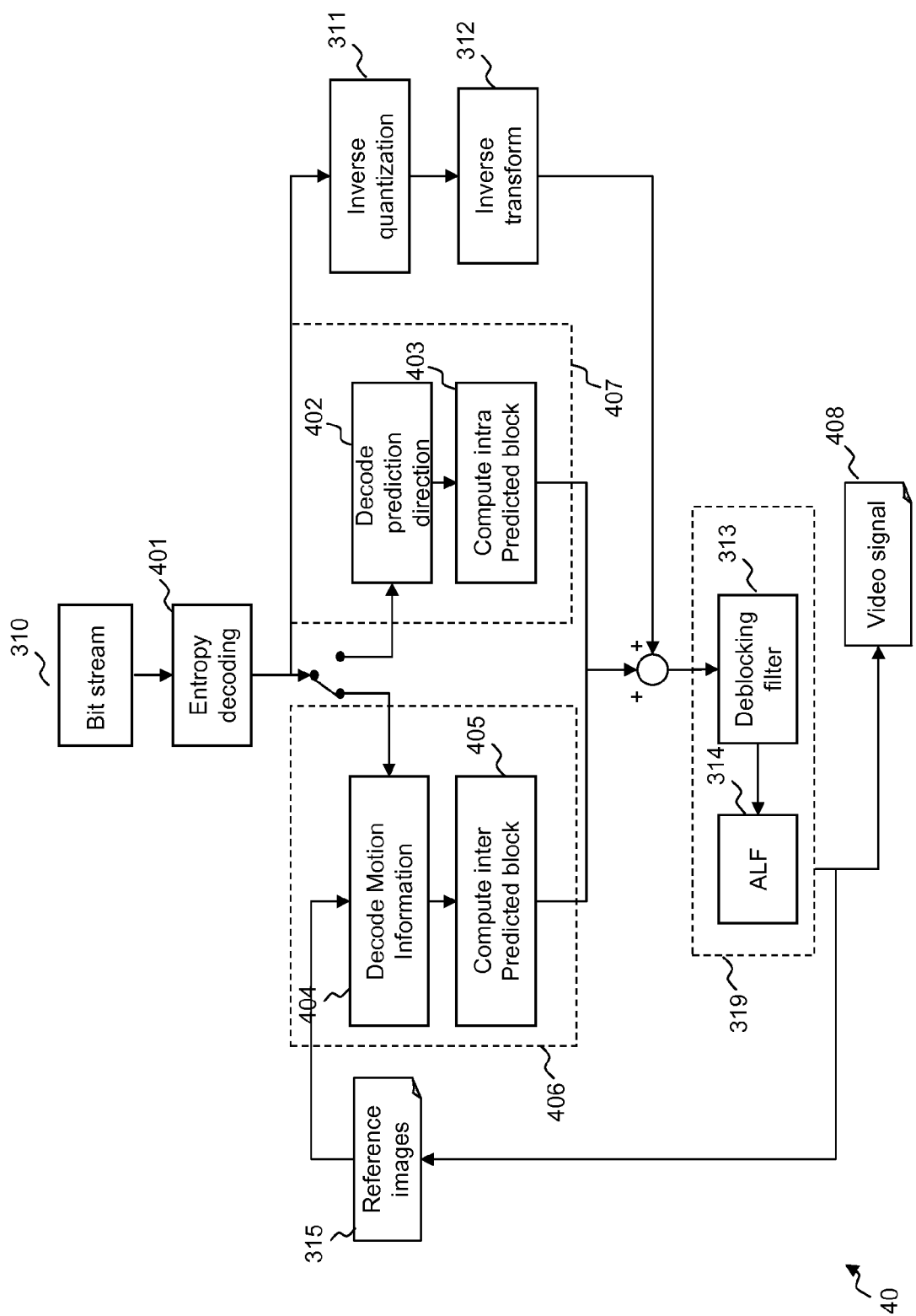
FIG. 4 is a schematic block diagram illustrating modules of an exemplary HEVC decoder.

FIG. 4 is a block diagram of an exemplary HEVC type video decoder 40. The decoder 40 receives as an input a bit stream 310 corresponding to a video sequence 201 compressed by an encoder of the HEVC type, such as the one in FIG. 3. During the decoding process, the bit stream 310 is first of all parsed with help of the entropy decoding module 401. This processing module uses the previously entropy decoded elements to decode the encoded data. It decodes in particular the parameter sets of the video sequence to initialize the decoder and also decodes LCUs of each video frame. Each NAL unit that corresponds to coding slices or entropy slices is then decoded. The parsing process that comprises entropy decoding 401, decode prediction direction 402 and decode motion information 404 stages can be done in parallel for each slice but PU prediction processes module 405 and 403 and loop filter module are preferably sequential to avoid issues of neighbouring data availability.

The partition of the LCU is parsed and CU, PU and TU subdivision are identified. The decoder successively processes each CU by intra (407) or inter (406) processing modules, inverse quantization and inverse transform modules and finally loop filter processing module (319).

The "Inter" or "Intra" coding mode for the current block is parsed from the bit stream 310 with help of the parsing process module 401. Depending on the coding mode, either intra prediction processing module 407 or inter prediction processing module 406 is employed. If the coding mode of the current block is "Intra" type, the prediction direction is extracted from the bit stream and decoded with help of neighbours' prediction direction during stage 404 of intra prediction processing module 407. The intra predicted block is then computed (403) with the decoded prediction direction and the already decoded pixels at the boundaries of current PU. The residual associated with the current block is recovered from the bit stream 401 and then entropy decoded.

If the coding mode of the current PU indicates that this PU is of "Inter" type, the motion information is extracted from the bit stream 401 and decoded (404). AMVP process is performed during step 404. Motion information of neighbours PU already decoded are also used to compute the motion vector of current PU. This motion vector is used in the reverse motion compensation module 405 in order to determine the "Inter" predictor PU contained in the reference images 315 of the decoder 40. In a similar manner to the encoder, these reference images 315 are composed of images that precede in decoding order the image currently being decoded and that are reconstructed from the bit stream (and therefore decoded previously).

The next decoding step consists in decoding the residual block that has been transmitted in the bitstream. The parsing module 401 extracts the residual coefficients from the bitstream and performs successively the inverse quantization (311) and inverse transform (312) to obtain the residual PU. This residual PU is added to the predicted PU obtained at output of intra or inter processing module.

At the end of the decoding of all the PUs of the current image, the loop filter processing module 319 is used to eliminate the block effects and improve the signal quality in order to obtain the reference images 315. As done at the encoder, this processing module employs the deblocking filter 313 and then the ALF 314.

The images thus decoded constitute the output video signal 408 of the decoder, which can then be displayed and used.

The decoder in this example comprises three main processing modules:
1. Syntax decoding module (401; 402; 404)
2. Pixel reconstruction module (405; 403; 311; 312)
3. Loop filter processing module (319)

Figure 5:
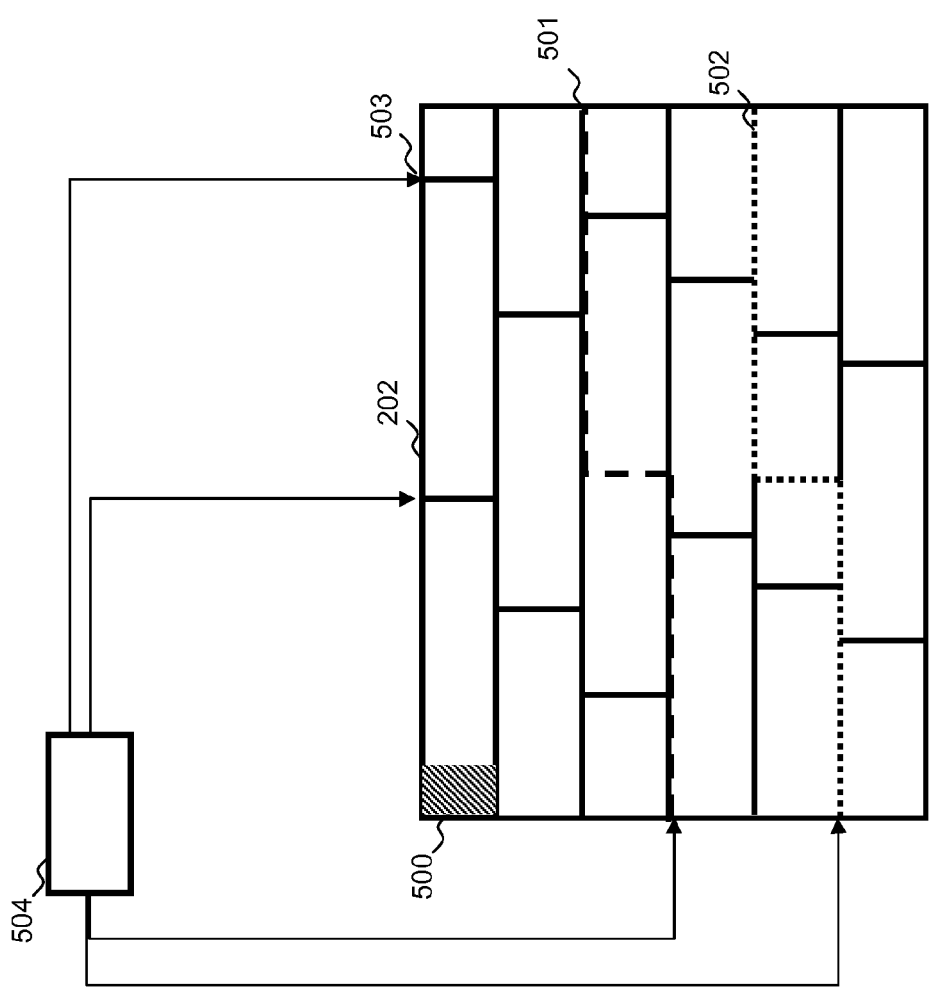
FIG. 5 is an example of an encoded image in accordance with a first embodiment of the invention.

FIG. 5 represents an example of an image encoded in accordance with a first embodiment of the invention. In the first embodiment of the invention the partitioning module 301 of the encoder 30 of FIG. 3 is modified as follows: the encoder uses a single NAL unit containing some frame encoded data per frame 202 and transmits a single header 500 at the beginning of the frame. Header 500 includes coding parameters, typically slice type, inter or intra prediction parameters and loop filter parameters. A new NAL unit 504 containing a slice information data set is created by the encoder and may be referred to as a slice parameter set NAL unit. The slice information data set includes data representative of a set of parameters indicating the different coding dependencies boundaries (501, 502 and 503) of the bitstream for each of the processing modules of the encoder, and identifying the processing type of each processing module. The encoding processes of the processing modules may include, for example, syntax encoding, pixel sample reconstruction and loop filtering. The set of coding units (CUs) between two coding boundaries is generally referred to as a "processing slice". The pseudo-syntax proposed below in Table 1 represents an example of the syntax of a new NAL unit 504 referred to as a Slice Parameter Set NAL unit.

TABLE 1

```
slice_parameter_set_nal_rbsp( ) {
    num_processing_slices_type
    for( i = 0; i < num_processing_slices_types; i++)
    {
        processing_slice_type[i]
        num_slice[i]
        for( j = 0; j < num_slice[i]; j++)
            slice_index_[i][j]
    }
    rbsp_trailing_bits( )
}
```

In some embodiments of the invention, the slice parameter set may include data defining the coding parameters, in which case the image may be transmitted without header 500.

In embodiments of the invention the slice information data set is encoded by the encoder. For example, each syntax element presented in bold in Table 1 can be binary coded preferably by a variable length coding method. It will be appreciated however that the invention is not limited to this particular binary coding method. The semantics of each coded item of the example of Table 1 are presented as follows:

num_processing_slice_type: An integer value greater than 0 which is equal to the number of different types of processing slice in the image processing_slice_type: An integer value that represents the type of the processing slice. The list of processing slice types is predetermined. The number of processing_slice_type syntax values coded in the bitstream is equal to num_processing_slices_types num_slice: For each processing slice type, the number of slices in an image is indicated by num_slice syntax element. The number of num_slice syntax values coded in the bitstream is equal to num_processing_slices_types slice_index: For each processing slice type, it is the index of the first CU of each processing slice of a specific type. The index value could be a byte address or a CU address. In the preferred embodiment, processing slices are defined at LCU level and thus slice_index is indicating one largest coding unit index.

rbsp_trailing_bits( ) is used to align the end of the NAL unit on byte.

In another embodiment, the slice information data set may be sent in an optional Supplementary Enhancement Information (SEI) NAL unit. SEI NAL units embeds proprietary information that are not normalized. A decoder that does not support SEI NAL unit can then discard them. The advantage of such a method is that the bitstream may be left unchanged and remain compatible with prior standards (e.g. H.264/AVC)

In the first embodiment, three types of coding dependency boundaries corresponding to three different types of encoding processes are considered:

1. The syntax coding boundaries (503) that enable the coding dependencies for entropy coding (309) and prediction mode coding (303 and 306) sub processes to be limited. CUs that are separated with such a boundary cannot use their neighbor's CU information to code the syntax values of current CU. The set of CUs that are bounded by two syntax coding boundaries are now referred as syntax slice.
2. Pixel samples reconstruction boundaries (502) that delimit spatially the dependencies with neighbor CUs for coding of pixels data (302; 304; 305; 307; 308). The encoding process of stage 302, 304 and 305 cannot use pixel data of a neighbor CU when they are separated by these boundaries. The set of CUs that are bounded by two pixel sample boundaries are now referred as reconstruction slice.
3. Loop filtering boundaries (501) that limit the loop filter process (319) that is composed of the deblocking filter (314) and ALF process (313). These two filters cannot use pixels across a boundary when filtering one pixel localized at the vicinity of such boundaries. The set of CUs that are bounded by loop filtering boundaries may be referred to hereafter as loop filter slice.

Syntax slices, reconstruction slices and loop filter slices may be referred to in following section by the generic term "processing slices".

The encoder encodes the locations of the processing slice boundaries in the NAL unit 504. The pseudo-syntax proposed below in Table 2 represents an example of the syntax of the new NAL unit 504 containing the slice information data set referred to as Slice Parameter Set NAL unit (SIPS NALU).

TABLE 2

```
slice_parameter_set_nal_rbsp( ) {
    num_syntax_slices_minus1
    for( i = 0; i < num_syntax_slices_minus1; i++)
        syntax_slice_delta_byte_index[i]
    num_recons_slice_minus1
    for( i = 0; i < num_recons_slices_minus1; i++)
        recons_slice_delta_index_in_CU[i]
    num_loop_filter_slices_minus1
    for( i = 0; i < num_loop_filter_slices_minus1; i++)
        loop_filter_slice_delta_index_in_CU[i]
    rbsp_trailing_bits( )
}
```

Table 2 may be included in addition to Table 1 in the Slice Parameter Set NAL unit.

The semantics of each coded item of the example is presented as follows:

num_syntax_slices_minus1 is a positive integer value that corresponds to the number of syntax slices minus 1 used in the current frame. A value of 0 for this item means that no additional syntax coding boundaries are defined in the frame than the one at the beginning of the picture. For any value greater or equal to 1, first CUs of the syntax slices are defined by a set of syntax_slice_delta_byte_index values syntax_slice_delta_byte_index is a byte offset in the frame that indicates a CU that is the first one in raster scan order of new set of coding units for which syntax is independently coded. There are as many syntax_slice_delta_byte_index values as indicated by num_syntax_slices_minus1 syntax element.

num_recons_slice_minus1 is a positive integer value that corresponds to the number of reconstruction slices minus 1 used in the current frame. A value of 0 for this item means that no additional sample reconstruction boundaries are defined in the frame than the one at the beginning of the picture. For any value greater or equal to 1, the pixel coding boundaries are defined by a set of recons_slice_delta_index_in_CU values.

recons_slice_delta_index_in_CU is a CU address offset in the frame that indicates one CU that is the first one in raster scan order of reconstruction slices. There are as many recons_slice_delta_index_in_CU values as indicated by num_recons_slice_minus1 syntax element.

num_loop_filter_slices_minus1 is a positive integer value that corresponds to the number of loop filter slices minus 1 used in the current frame. A value of 0 for this item means that no additional loop filtering boundaries are defined in the frame than the one at the beginning of the picture. For any value greater or equal to 1, the syntax coding boundaries are defined by a set of loop_filter_slice_delta_index_in_CU values loop_filter_slice_delta_index_in_CU is a CU address offset in the frame that indicates one CU that is the first one in raster scan order loop filter slice. There are as many loop_filter_slice_delta_index_in_CU values as indicated by num_loop_filter_slices_minus1 syntax element.

The first CU address of a syntax slice is computed relative to the first CU of previous syntax slices in raster scan order. To decode the byte address of the first CU of the $i^{th}$ syntax slice, the decoder has to sum the first i syntax_slice_delta_byte_index values. Same principle applies for recons_slice_delta_index_in_CU and loop_filter_slice_delta_index_in_CU syntax elements. This enables the amount of bits needed to code the processing slices to be reduced.

The encoder creates syntax decoding boundaries with a fixed number of bytes between two boundaries, i.e. a fixed number of bytes can be used for syntax slices. In a particular embodiment of the invention for example, the predetermined number of bytes may be equal to the maximum size of a transmission unit (MTU) i.e. a network packet. The syntax boundaries may also be defined in terms of a fixed number of CUs between two boundaries.

Sample reconstruction boundaries may be defined such that a predetermined number of CUs is maintained between two boundaries. Each reconstruction slice may in some embodiments be defined to enclose the same number of CUs or in other embodiments to have different number of CUs. For loop filter boundaries, the frame may be divided in a predetermined number of areas that have the same surface in CU. Loop filter slices may also be defined by a fixed number of CUs.

It will be appreciated that slices corresponding to the same processing type may be defined by the corresponding slice boundaries to each be of the same size or to be of different sizes.

As a main difference with the prior art, this process enables coding boundaries to be defined advantageously for several processing modules (also called encoding processes) independently. The boundaries can be adapted according to variable slice boundary defining parameters such as the application or the characteristics of the corresponding processing modules. For instance, the syntax decoding boundaries may be defined to achieve a high level of error resilience in case of packet loss during network transmission: the syntax coding boundaries matches the requirement of the network characteristics. Sample reconstruction boundaries are defined independently of syntax coding boundaries which permit to save bitrate. Indeed sample reconstruction boundaries are generally drastically increasing the bitrate of a video sequence. Avoiding the use of synchronised syntax coding and sample reconstruction boundaries enables the bitrate to be saved while maintaining the interest of creating coding boundaries for limiting error propagation. Defining independent boundaries for loop filter process permits to adapt the filtering to the content of the video sequence.

In one embodiment, other syntax elements are added to the slice parameter set in addition to the processing slices definition. These elements may define coding parameters that applies only for one type of processing slice. These parameters must be used to refine the coding parameter of one type of processing slice. For instance, for syntax coding, the entropy coding method Context-adaptive binary arithmetic coding (CABAC) or Context-adaptive variable-length coding (CAVLC) can be defined. This enables adaptive selection of the optimal entropy coding method for specific areas of the bitstream. Another usage is to adaptively disable loop filters for specific areas between two loop filter coding boundaries. The encoder could deactivate loop filters for areas where loop filters are useless or where no visual improvement is provided. Different ALF coefficients can also be defined for each of the loop filter slices. For sample reconstruction process, specific coding parameters such as the weighted prediction values can be used.

The slice parameter sets NAL (SIPS) unit including the slice information dataset is sent prior the slice NAL units. One coding dependencies NAL unit is sent for each access unit to define the coding boundaries for each frame. In one embodiment, if the coding dependencies boundaries are pre-defined for the whole video sequence the coding boundaries are defined in Sequence Parameter Sets. If the coding boundaries change for each frame, the SIPS NAL unit can be merged with Picture Parameter Set.

The decoder 40 could advantageously use this SIPS NAL unit to improve its decoding process. Indeed, for each access unit (i.e. coded data corresponding to one picture), the decoder starts the decoding process of SIPS NALU. From the extracted parameters, the decoder is able to run in parallel syntax decoding processes. Each syntax decoding process starts at the byte offset indicated with help of syntax_slice_delta_byte_index values of SIPS NAL unit. Similarly, pixel reconstruction and loop filtering processes are also parallelized for each corresponding processing slice.

Another advantage of the embodiment of the invention resides in the fact that the decoder could allocate its decoding resources in function of the SIPS NAL unit parameters. Indeed, the number of coding boundaries for each processing module is defined in this NAL unit which is sent prior to the coded data corresponding to the frame. Thus, the decoder can adapt the number of processing modules that could be run in parallel. For instance, considering that the SIPS NAL unit indicates 4 independent syntax coding areas (i.e. 4 syntax slices), 2 independent pixel reconstruction areas (i.e. 2 reconstruction slices) and 6 loop filtering areas (i.e. 6 loop filter slices) and the decoder is able to run 6 threads in parallel. As syntax decoding is often the most CPU consuming process, the decoder allocates 4 threads to decode the syntax slices and uses 2 threads for reconstruction slices and loop filter slices.

Figure 6:
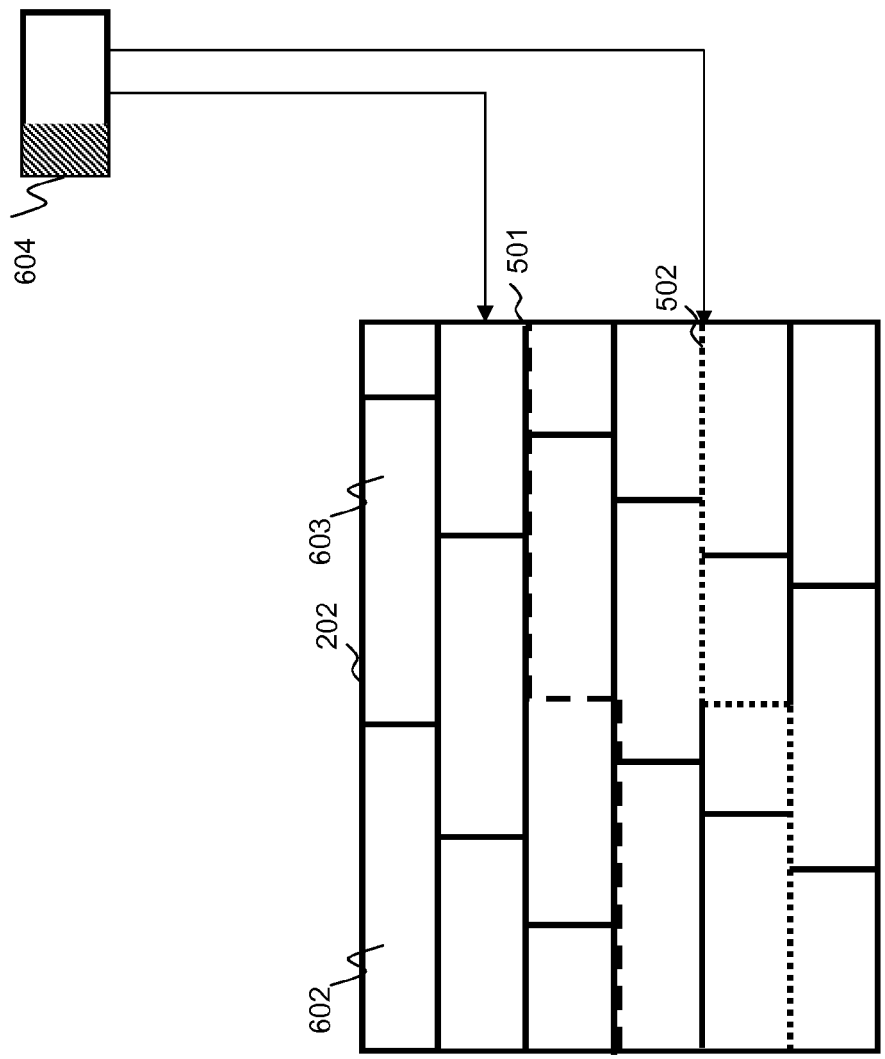
FIG. 6 is an example of an encoded image in accordance with a second embodiment of the invention.

FIG. 6 schematically illustrates an image coded in accordance with a second embodiment of the invention. In the same manner as the first embodiment, the coding boundaries are determined by block partitioning module 301. In this embodiment the syntax slices 602 and 603 are represented in the bitstream by NAL units. NAL units convey the coded data and replace usual slices (as defined in AVC for instance) and entropy slices. A single type of slice, such as a syntax slice is thus transmitted as an NAL unit. The advantage of this method is that the packetization process of the server can be simplified since syntax slices are represented in independent NAL units. Only syntax elements that are related to syntax coding process parameters are presented in syntax slices headers. Moreover, syntax elements that are related to syntax coding process parameters and that change from one slice to another and which are stored in another NAL unit are represented in the syntax slice header. Typically, the entropy_code_mode_flag defined in PPS for H.264/AVC is moved to the syntax slice header. In addition, Picture Order Count (POC) syntax elements, quantizer parameters and a deblocking filter flag which are classically defined at slice level for H.264/AVC and HEVC are added to the slice parameter information SIPS NAL unit.

Coding syntax of syntax slices that may be used for this embodiment is as follows:

TABLE 3

```
syntax_slice_layer_rbsp( ) {
    entropy_coding_mode_flag
    first_lctb_in_slice
    slice_data( )
    rbsp_trailing_bits( )
}
```

Entropy_coding_mode_flag is a flag that states if Context-adaptive binary arithmetic coding (CABAC) or Context-adaptive variable-length coding (CAVLC) coding should be employed for decoding current slice First_lctb_in_slice indicates the address of the first CU of the slice in the image Slice_data( ) represent the coding data of the slice (similar to HEVC or AVC)

In one embodiment, an entropy_coding_mode_flag is fixed for the entire video sequence—in such a case it can be defined in SPS or PPS NAL unit instead of or in addition to in the slice NAL unit.

Other coding boundaries (501; 502) are still coded in SIPS NAL unit. Coding parameters dedicated to one type of processing (either pixel reconstruction or deblocking filter processes) are stored in addition to the definition of processing slice boundaries. These parameters can be defined in common for all processing slices or independently for each one. For instance, the pseudo code below in Table 4 represents the syntax of one slice parameter set (604) of an embodiment of the present invention.

TABLE 4

```
Slice_parameter_set_rbsp( ) {
    frame_type;
    frame_num;
    pic_order_cnt;
    num_recons_slice_minus1
    for( i = 0; i < num_recons_slice_minus1; i++)
        recons_slice_delta_index_in_CU [i]
    for( i = 0; i <= num_recons_slice_minus1; i++)
        recons_slice_qp_delta[i]
    pred_weight_table ( )
    ref_pic_list_reordering ( )
    num_loop_filter_slices_minus1
    for( i = 0; i < num_loop_filter_slices_minus1; i++)
        loop_filter_slice_delta_index_in_CU [i]
    for( i = 0; i <= num_loop_filter_slices_minus1; i++)
        disable_deblocking_filter_idc[i]
    alf_param_list( )
    rbsp_trailing_bits( )
}
``` frame_type refers to the type of slices. The slices may be either Inter or Inter. In most situations the prediction type of entropy slices are defined for each frame. Every processing slice of the image has the same type. For this reason slice_type is defined for one picture or image.

frame_num is a value that counts the number of frames that have been used as a reference from the beginning of the sequence. It allows the detection of reference frame loss. This value does not change from one processing slice to another; therefore it is defined for all processing slices of the frame.

pic_order_cnt is a value that represents the index of the frame in decoding order. In HEVC, this value is defined for each HEVC slice. In this embodiment of the invention, this value is defined for all processing slices of the frame since the value remains unchanged between two coding areas.

recons_slice_qp_delta is the quantization parameter value that is used to quantize the residual of a sequence. The value of this parameter could be adapted as a function of the high frequencies of each reconstruction slice. One syntax element is thus coded for each reconstruction slice.

Pred_weight_table( ) refers to the coding syntax of weighted prediction coefficients for inter prediction process. This process which is clear to the skilled person in the art is not detailed further in this document. Coding syntax similar to AVC or HEVC' may be used.

ref pic_list_reordering( ) refers to the coding syntax of commands to reorder the reference pictures in the reference picture buffer 315. This syntax is not detailed further in this document and syntax similar to AVC or HEVC is used.

disable_deblocking_filter_idc is a flag that disables the deblocking filter. The value of this parameter could be adapted as a function of each loop filter slice. One syntax element is thus coded for each loop filter slice.

alf_param( ) refers to the coding syntax of adaptive loop filter coefficients. This syntax is not detailed further in this document and syntax similar to HEVC is used.

The advantage of including coding parameters of processing slices in a slice parameter set NALU is that this information is not duplicated in slices. A number of bits are thus saved with this method and the bitrate of the resulting bitstream is lower in proposed embodiments of the invention. Moreover, the decoder is able to initiate its coding process modules before decoding the slice data. The CPU resource shared between the processing units could be adapted based on these coding parameters.

In a streaming scenario, network packet transmission may protected by an error correction technique, for example by forward error correction codes (FEC). The principle of FEC is to generate new FEC packets from a predetermined number of network packets. A FEC packet is capable of correcting for loss of one packet if all the other packets among the predetermined packets are correctly received. FEC packets increase the bitrate of the sent data and may be used to protect the most important data that may typically include the parameters of AVC's coding slice header. Another advantage of including coding parameters of processing slices in a slice parameter set NALU is that the size of the parameters is negligible in comparison to AVC coding slice data. The FEC data bitrate required to protect these parameters is thus reduced in comparison of AVC. Indeed, the FEC packets are not required to also protect the slice data since the slice parameter data and the slice data are embedded in separate NAL units.

The previous embodiments could be improved by creating parameter set NAL unit types for each type of processing slice. Each processing slice may then use an identifier value to retrieve the appropriate processing slice parameter set NAL unit. The new processing slice parameter sets NALU enables the parameters of each processing slice of the same type to be gathered in a single NAL unit. Table 5 presents an example of the coding syntax for the reconstruction slice parameter set NAL unit:

TABLE 5

```
Recons_slice_parameter_set_rbsp( ) {
    Recons_slps_id
    recons_slice_qp_delta
    pred_weight_table ( )
    ref_pic_list_reordering ( )
    rbsp_trailing_bits( )
}
``` recons_slps_id is an integer value indentifying a Reconstruction Slice Parameter Set (RSIPS). This identifier can be unique for each RSIPS of one access unit of the video sequence.

recons_slice_qp_delta is a value representing the quantization parameter.

the remaining syntax elements have already been described in previous embodiments The following lines in Table 6 present an example of the coding syntax of the loop filter slice parameter sets.

TABLE 6

```
Loop_filter_slice_parameter_set_rbsp( ) {
    lf_slps_id
    disable_deblocking_filter_idc
    alf_param_list( )
    rbsp_trailing_bits( )
}
``` lf_slps_id is an integer value that identifies a Loop filter Slice Parameter Set (LSIPS). This identifier can be unique for each ISIPS NAL unit of one access unit of the video sequence.

disable_deblocking_filter_idc is a flag that permits to disable the deblocking filter for one loop filter slice.

the remaining syntax elements have already been described in previous embodiments The syntax of the SIPS NAL unit determines the different processing slices of one frame and for each processing slice, one processing slice' parameters set identifier is coded. For example, in coding syntax below, recons_slps_id (respectively lf_slps_id) is an identifier value that refers to one RSIPS (reconstruction SLPS) NAL unit (respectively LSIPS (loop filter SLPS) NAL unit). One identifier is specified for each processing slice.

TABLE 7

```
slice_parameter_set_nal_rbsp( ) {
    num_recons_slice_minus1
    for( i = 0; i < num_recons_slices_minus1; i++)
    {
        recons_slice_delta_index_in_CU[i]
        recons_slps_id[i]
    }
    num_loop_filter_slices_minus1
    for( i = 0; i < num_loop_filter_slices_minus1; i++)
    {
        loop_filter_slice_delta_index_in_CU[i]
        lf_slps_id[i]
    }
    rbsp_trailing_bits( )
}
```

This embodiment enables several processing parameters to be obtained for each processing slice unit that can be adapted during the coding of the sequence.

Figure 7:
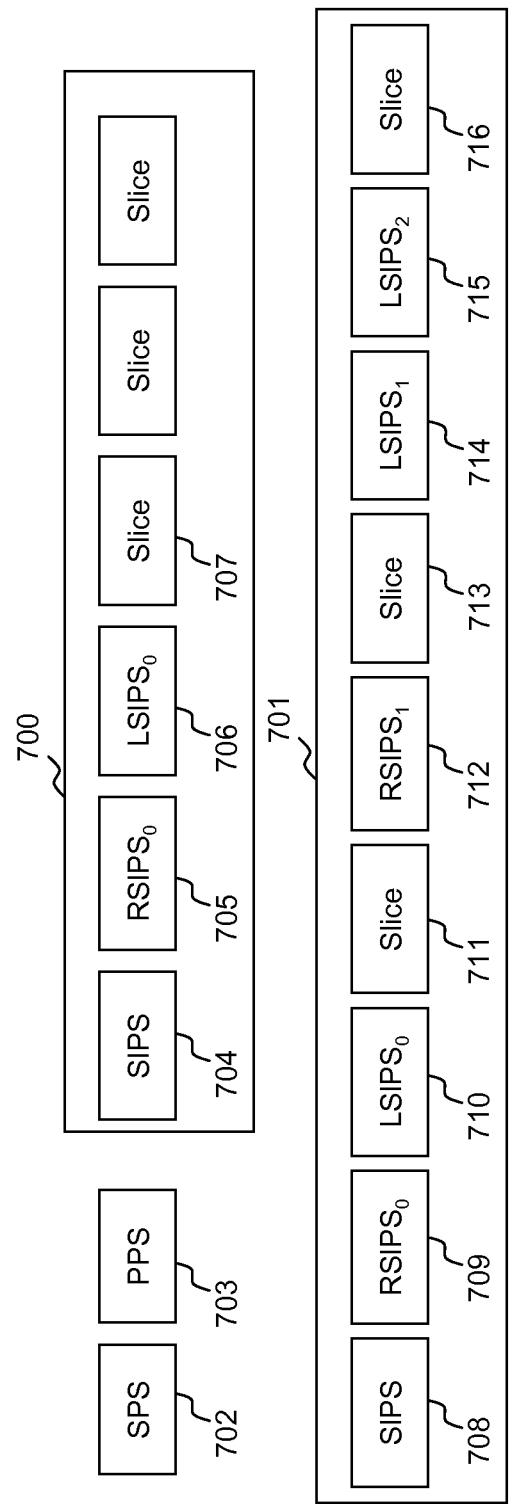
FIG. 7 is an example of an encoded bitstream in accordance with a further embodiment of the invention.

FIG. 7 schematically represents NAL units that constitute the encoded bitstream in accordance with the third embodiment. The encoded bitstream begins with Sequence Parameter Set (702) and Picture Parameter Set (703) NAL units. Then, the encoded frame 700 starts with a slice parameter information dataset SIPS NALU 704. This NAL unit is sent prior to any NAL slice units of the frame. Then a processing slice parameter set NALU dedicated to processing parameters for reconstruction slices (705) and a processing slice parameter set NALU dedicated to processing parameters for Loop filter slices 706 are transmitted. The order of these two NALUs is not imposed and the NALU for the Loop filter slice parameter set 706 may be transmitted prior to the reconstruction slice parameter set NALU 705. For image 700, slice processing parameters are the same for the entire frame. Thus no other processing slice parameter sets NAL units are transmitted.

For new frame 701, the encoder defines new SIPS 708 and slice processing parameter sets NALU 709 and 710 at the beginning of the new frame. The identifier of NALU 709 and 710 is reset to 0 since a new frame has been started. Then the encoder encodes coding units CUs of frame 701. After having encoded a first set of CUs, the encoder handles a new reconstruction slice which has different processing parameters. Since, the first CU of this new reconstruction slice is coded in the second slice, the new parameter sets of the reconstruction slice are transmitted prior to slice 713 in NALU 712. This example illustrates one property of Slice Processing Parameter Sets: the availability of a Slice Processing Parameter Set should be prior to the coding of the first CU that refers to this Parameter Sets. For instance, the frame 701 is divided into three loop filter slices that have different processing parameters.

The CUs of first loop filter slice are embedded in slices 711 and 713. The CUs of second and third loop filter slices are contained in the last slice 716. Thus, Loop Filter Slice Parameter Sets of the two last loop filter slices should be available prior to the slice 716. In the example of FIG. 7, the encoder chooses to send Loop Filter Slice Parameter Sets 714 and 715 just before the slice 716 but alternatively they could have been sent just after LSIPS 710.

In the preceding embodiments three types of encoding processes have been considered: a syntax coding process, a pixel sample reconstruction coding process and a loop filter process. HEVC syntax coding processes are typically composed of entropy coding and motion vector prediction processes. This is due to the fact that the entropy process uses decoded motion vectors values of neighbouring CUs to code one codeword. This limitation requires that the two processes are considered as one process. In another embodiment it may be considered that the entropy coding processes and motion vector coding are not dependent. For example, an entropy coder may use simple coded motion information such as reference picture index to compute codewords. In such a case, it will be appreciated that the syntax process can be split into two independent processes and new processing slices can be defined accordingly.

Figure 8:
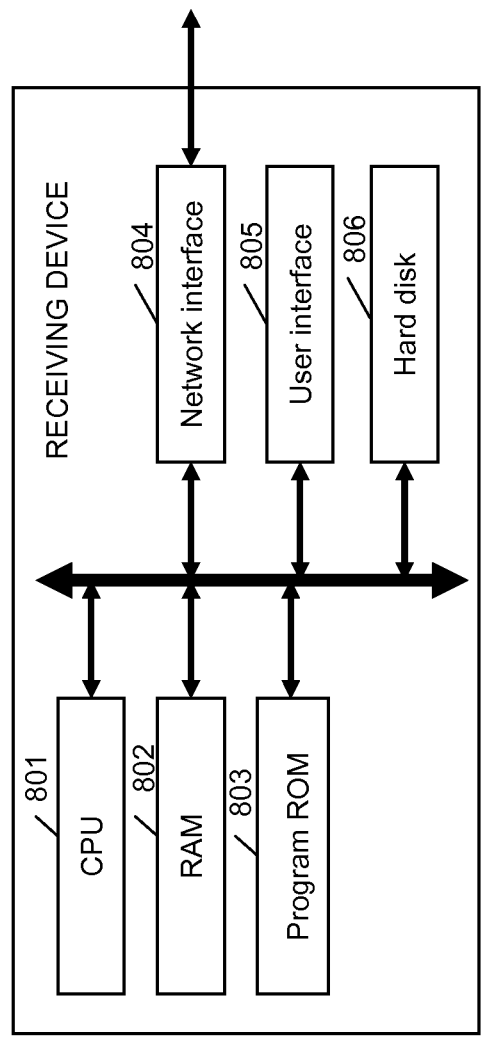
FIG. 8 is a block diagram of an encoding device or a decoding device in which embodiments of the invention may be implemented.

FIG. 8 illustrates a block diagram of a receiving device such as client terminal 102 of FIG. 1 or transmitting device, such as server 101 of FIG. 1 which may be adapted to implement embodiments of the invention.

The device 800 comprises a central processing unit (CPU) 801 capable of executing instructions from program ROM 803 on powering up of the device 800, and instructions relating to a software application from a main memory 802 after powering up of the device 800. The main memory 802 may be for example of a Random Access Memory (RAM) type which functions as a working area of the CPU 801, and the memory capacity thereof can be expanded by an optional RAM connected to an expansion port (not illustrated). Instructions relating to the software application may be loaded into the main memory 802 from a hard-disc (HD) 806 or the program ROM 803 for example. Such a software application, when executed by the CPU 801, causes the steps of the method of embodiments of the invention to be performed on the device.

The device 800 further includes a network interface 804 enabling connection of the device 800 to the communication network. The software application when executed by the CPU is adapted to receive data streams through the network interface 804 from other devices connected to the communication network in the case of a receiving device and to transmit data streams through the network interface 804 in the case of a transmitting device.

The device 800 further comprises a user interface 805 to display information to, and/or receive inputs from a user.

Figure 9:
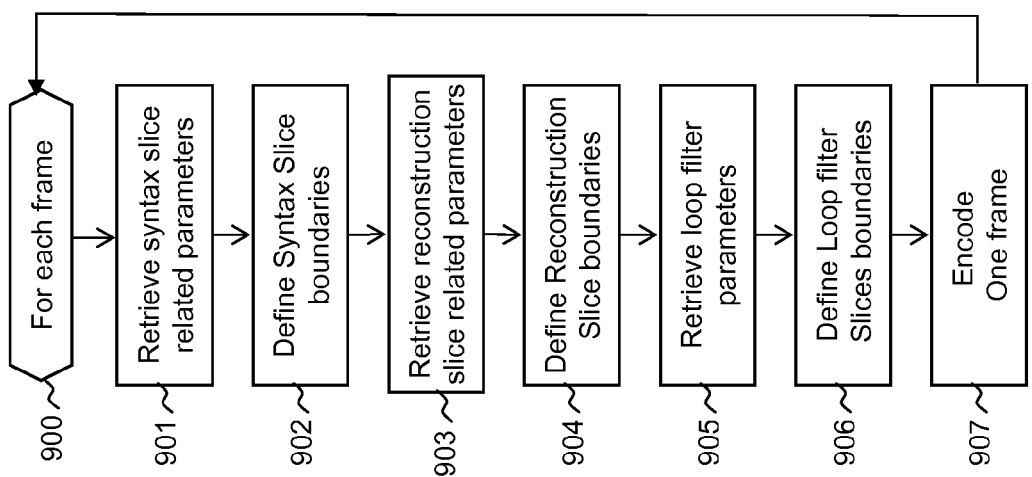
FIG. 9 is a flow diagram illustrating steps of a method of defining processing slice boundaries according to an embodiment of the invention.

FIG. 9 is a flow chart illustrating steps of a method for an encoder to define processing slice boundaries. This diagram focuses mainly on the determination of the syntax slices, reconstruction slices and loop filter slices boundaries. It will be appreciated however that, the method may be extended to support further processing slices. The encoder of the invention adds new processing stages (901 to 902) to a classical HEVC encoder 30 the process of which is included in the step 907.

The algorithm successively applies stages 901 to 907 to each frame representative of an image of a video sequence. It forms a processing loop whose end is controlled by the test stage 900. The loop process ends once all frames of the video sequence have been processed. The method starts by defining in steps 901 to 906 the slice boundaries of the processing slices and ends with frame encoding process (907).

Slices group together a set of CUs that can be independently parsed without reference to CUs outside slide boundaries. Such a feature is useful for two purposes. First, for streaming of the video data, NAL units of slices are embedded in network packets. As described above, these NAL units can be split into several network packets, called fragmented NAL units, if their sizes are bigger than MTU size. When one fragmented NAL unit is lost, the entire slice NAL unit is discarded since it cannot be parsed. Consequently, defining the slice size to be less than the MTU size is optimal in the point of view of error robustness efficacy. However, defining slice sizes has an impact on the coding efficiency of the video frame, since breaking coding dependencies increases the code rate of the stream. For this reason, the proposed algorithm in accordance with an embodiment of the invention adapts the size of the slices as a function of network characteristics. The second useful property of processing slices is that they permit parallel processing on decoder side since the processing slices are independently coded. On the one hand, using a low numbers of processing slices per frames will under use a decoder which has high multi-threading capabilities. On the other hand, using a high number of slices can reduce the coding efficiency without improving the multi-threading efficiency of the decoder. Such parameters may be taken into account when defining the slice boundaries.

In the embodiment illustrated in FIG. 9 the server retrieves network characteristics in 901 and stores them in memory. For example, the server may store the MTU size and the observed rate of packet loss in the network. This last value may change at each processing iteration in congested or unstable networks. If the network characteristics are not available in real time (e.g. for a pre-coded video sequence), a typical mean value may be fixed based on previous streaming experiments. In that case, step 901 is performed once at the beginning of the video sequence encoding process. The server may determine slice boundaries from these two values according to the following principle. If the loss rate is above a pre-determined threshold (meaning that the probability of packet loss is high), the number of bytes allocated to each syntax slice is defined to be a number equal to MTU size minus the cost of NAL unit headers. This ensures that the received packet on decoder will be decodable. On the contrary, if the loss rate is below the threshold, the probability of packet loss is very low and thus the number of bytes allocated to a slice is defined to be N times the MTU size. N is typically equal to 5 but may be any value greater than 1 can be used. A typical value of the loss rate threshold could be 0.01% of packet loss. In order to avoid using a threshold value, the size S of a slice could be defined according to the following equation: $S=1/R*MTU$ where R is a floating value representing the loss rate such that R is equal to 0 for lossless networks and is equal to 1 when every packet is lost. Finally, in step 902 the slices size is adapted as a function of network characteristics.

These steps could also use the decoder multi-threading capabilities retrieved in step 901 to define the syntax slice size. The multi-threading capabilities are the number T of syntax decoding processes that could run in parallel on decoder side. In step 902 the number of bytes $N_{SS}$ allocated per syntax slice based on coding characteristics is determined. Next, the number of bytes $N_{frame}$ allocated to the current frame is retrieved. This number can be deduced from statistics made on previous frames sizes or based on a rate control parameter. If the ratio of $N_{frame}$ divided by $N_{SS}$ is less than the number of decoder's threads T, then value $N_{frame}/T$ is attributed to the size of slice. Consequently the number of syntax slices can be adaptively defined in function of network characteristics as well as decoder multi-threading capabilities.

The following steps include the determination of reconstruction slice boundaries for pixel sample reconstruction processes. Reconstruction slices define independent coding areas where pixels can be decoded without reference to other areas of the image. They also limit error propagation in frame in case of packet loss: only the reconstruction slice that has been partially received or which is erroneous contains badly decoded pixels; pixels of other reconstruction slices remain correct if correctly received. Thus, defining numerous reconstruction slices is useful for streaming scenario since it facilitates the error resilience functionality but also increases the coding sizes of video frames. It is therefore a key point to find a trade-off between error resilience level and the compression rate. In one embodiment, a set of properties of the video decoder is retrieved in step 904 which represents the error concealment capabilities of the decoder. Error concealment is a decoding feature used in case of packet loss that hides erroneous areas of an image. These algorithms use correctly decoded data to predict lost information. Error concealment algorithms may be categorised in three types:

1. Spatial error concealment (SEC) uses pixel information of current frame to correct erroneous blocks. One spatial error concealment method is directional prediction which determines gradients in blocks surrounding lost blocks to determine one direction to diffuse pixels of surrounding blocks of an erroneous block. More complex algorithms such as inpainting methods can also be employed but generally involve high CPU consumption.
2. Temporal error concealments (TEC) employ motion information of previously decoded frames to correct one block in a current frame. One method is motion extrapolation that uses motion vector field of a previous frame to compute the motion vectors of the lost blocks. This motion field is projected in current frame and is scaled according to the distance with the reference frame. Motion compensation is then performed with concealed motion vector value.
3. Spatiotemporal error concealments (STEC) are generally composed of one temporal EC prediction followed by a refinement of the prediction with spatial information. Classically motion extrapolation predicts one block and then pixels on the boundaries of the erroneous block are compared to the predicted block. The predicted block is then adapted to match the contours present in the boundary.

Consequently, the variety of error concealment algorithms is huge: some algorithms are very efficient but very complex and others are real-time with lower quality results. During step 904, reconstruction slices boundaries may be also defined with reference to error concealment estimated quality. Consequently, in step 903 a parameter representing the characteristics of regions that are guaranteed to be concealed with a high level of quality is retrieved. For instance, temporal algorithms may indicate that regions with constant motion between two frames are easily predicted and that regions with high motion are difficult to correct. Spatial error concealment may specify that region with high frequencies cannot be correctly predicted but on the opposite smooth area are very easily predicted. SEC quality depends also on the location of the error: indeed on the border of the image all neighbours are not available and also SEC may have difficulties predicting the data. For spatiotemporal EC, high frequencies regions are better predicted since more contours are available in the boundaries of the erroneous areas with ease for the algorithm. In step 903 statistics on the video frame are retrieved in order to identify high and low motion regions and also smooth and textured areas.

In embodiments of the invention the level of high frequencies may be determined by computing the variance in the image. This variance is computed on each CU. Then blocks with a variance below a predetermined threshold are categorized as low frequencies block, and blocks with a variance above a the same predetermined threshold are categorized as high frequencies block.

From these categories, in step 904 the video frame is segmented into two types of regions: regions that are likely to be easily predicted by EC and regions that are complex to conceal. In this process, blocks of the image are scanned in raster scan order. When a current block belongs to a different category than the preceding block, a new region is created. A single reconstruction slice is used for each of the regions marked as easily concealed (regions with low frequencies blocks). Complex regions (regions with high frequencies blocks) are subdivided into several reconstruction slices in order to limit the error propagation within such areas.

Finally, the last stage is the generation of loop filter slices. This process is similar to that for syntax and reconstruction slices: step 905 retrieves a set of parameters that may be used to generate loop filter slice boundaries in step 906. These parameters are statistics on the video frame. As for reconstruction slices, the video frame is partitioned into smooth (low frequencies) and textured (high frequencies) regions. Indeed, loop filter (in particular ALF) is very efficient in areas where high frequencies are employed. However, ALF filter is optimal if its parameters are regularly adapted to these areas. Moreover, smooth areas are improved by ALF, but generally using a single filter for all these areas is very close to the optimal solution. For these reasons, a single loop filter slice is defined in step 906 for each smooth region and textured areas are subdivided into multiple loop filter slices. A predetermined number of CUs is attributed to each loop filter slice in textured areas.

Accordingly, the method proposed in this first embodiment enables processing slice boundaries to be adaptively defined as a function of several characteristics such as:
the decoder' parallelisation and concealment capabilities
network characteristics
video characteristics.

Figure 10:
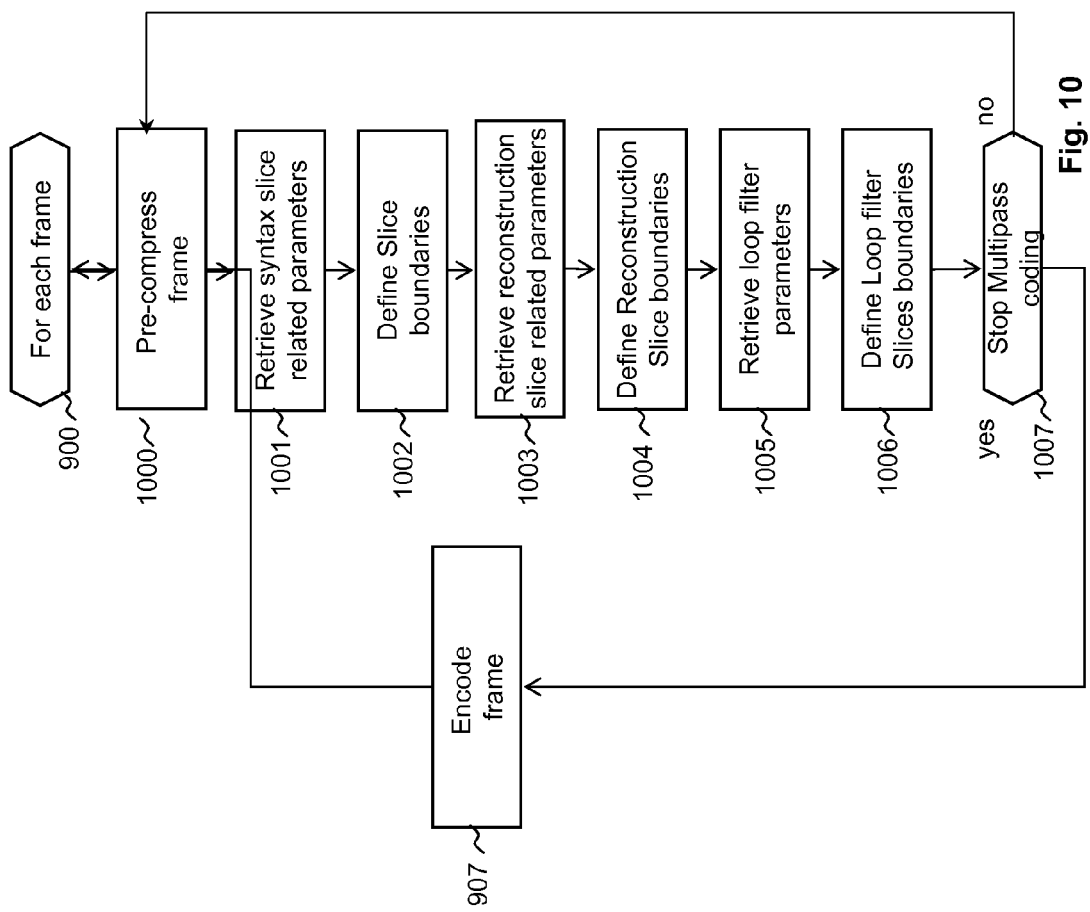
FIG. 10 is a flow diagram illustrating steps of a method of defining processing slice boundaries according to a further embodiment of the invention.

FIG. 10 illustrates the steps of a method for determining slice boundaries according to a further embodiment of the invention. In the further embodiment the processing slice boundaries are determined based on rate distortion criteria. This method is described with reference to the diagram of FIG. 10. As in FIG. 9, determination of processing slices boundaries is performed on a frame by frame basis.

Each frame is firstly pre-compressed in step 1000 which consists in performing a classical encoding process that ends before outputting coded data. Coding mode and other coding parameters are also determined for each CU.

These parameters are retrieved in step 1001 where syntax slice related parameters are retrieved, in step 1003 where reconstruction slice related parameters are retrieved and in step 1005 where loop filter parameters are retrieved. They are used to define the respective processing slice boundaries in steps 1002, 1004 and 1006. First, the syntax slices are determined 1002. The principle of step 1002 is to mark CUs that are not correlated with their neighbours for syntax coding process as candidates for a slice boundary.

Syntax coding parameters corresponding to entropy coding context model are retrieved in step 1001. The entropy coding context of each CU is analysed to identify CUs that have data which are not well predicted by the entropy context model. These CUs are marked as candidates for slice boundaries for syntax processing.

In order to determine boundaries for reconstruction slices in step 1004 the coding parameters retrieved in step 1003 are used and CUs that have a few spatial correlations with neighbouring CUs are identified and marked as candidates for reconstruction slice boundaries when one of the following criteria is fulfilled:
  CU is Inter and AMVP uses only the temporal predictor. This indicates that the temporal predictor is closer to the current block's motion vector than the spatial predictors and also that spatial correlation between CUs is likely to be weak.
  CU is Inter and AMVP uses a number of bits to indicate the predictor index above a predetermined threshold. Spatial and temporal predictors are very different: correlation with neighbours is not high.
  CU is Intra and DC mode (similar to the H.264/AVC DC mode) is used. Intra prediction fails to find a proper intra prediction direction and thus it could be deduced that spatial correlation is weak.

Finally, loop filter boundaries are determined in step 1006 by using the loop filter parameters retrieved in step 1005. CUs marked as boundaries for the loop filters are the ones that fulfilled one of following criteria:
  The boundary strength of the Deblocking filter is below a threshold (typically equal to 1) for all filtered pixels of the CU.
  ALF filter is deactivated for the CU.

Finally, stages 1002, 1004 and 1006 have identified CUs that are likely to define good processing slice boundaries. If the number of identified CUs is above a threshold each step 1002, 1004 and 1006 removes marked CUs that are close in the frame until reaching the threshold limit. The set of CU candidates is then fixed for the entire frame.

In one embodiment, the frame is then compressed and encoded again in step 907 with one new processing slice starting at each remaining marked CUs. The testing stage 1007 thus always selects the "yes" branch.

In another embodiment, multi-pass encoding is performed to find a processing slice partition scheme that minimizes the rate distortion criteria. Step 1007 loops on steps 1000 to 1006 for a predetermined number of iterations for instance. On each loop, steps 1002, 1004 and 1005 successively select a different combination of a predetermined number of CUs in the set of candidates. When the best combination is identified, the frame is encoded in 907.

In one embodiment the slice boundaries for an encoding process comprising pixel reconstruction are defined such that the surface area of the image represented by the slice is inferior to a surface area depending on the error concealment capability of the decoder. In another embodiment at least one of the characteristics of data content of the video sequence is a level of prediction by the entropy context model defined in syntax coding parameters for the syntax coding process.

The advantage of this embodiment is that the generated encoded frame has the processing slice partition that provides the best rate distortion results. The resulting bitstream keeps the advantages of slice partitioning for streaming and also ensures that the resulting bitstream is optimal in terms of coding efficiency Although the present invention has been described hereinabove with reference to specific embodiments, the present invention is not limited to the specific embodiments, and modifications will be apparent to a skilled person in the art which lie within the scope of the present invention.

For example, while the foregoing embodiments have been described with respect to three types of encoding/decoding processes it will be appreciated that the invention may be adapted any number of types of encoding/decoding processes, and to encoding processes of different types to those described above.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of determining slices for encoding an image of a video sequence, the image being represented by a plurality of coding units, the encoding comprising a first encoding process and a second encoding process for encoding the image wherein each encoding process introduces coding dependencies between coding units, the method comprising:
   determining, for each encoding process, a respective set of slice boundaries wherein the set of slice boundaries for each encoding process partitions the image into one or more slices for the respective encoding process, the one or more slices each including a set of coding units of the image between a pair of respective slice boundaries and the coding units of one slice being encoded independently of the coding units of another of the slices of the encoding process concerned;
   wherein the slice boundaries for the first encoding process are determined as a function of at least one slice boundary defining parameter independently from the slice boundaries for the second encoding process, the at least one slice boundary defining parameter being representative of at least one of characteristics of a network via which the encoded image is to be transmitted,
   wherein the at least one slice boundary defining parameter defines a size of a maximum transport unit of said network so that the size of a slice between two slice boundaries is determined in the following way:
      if the packet loss rate of the network is above a predetermined packet loss rate threshold, the slice boundaries are defined such that the size of a slice between two slice boundaries is less or equal to the size of a maximum transport unit; otherwise
      if the packet loss rate is less than the predetermined packet loss rate threshold, the slice boundaries are defined such that the size of a slice between two slice boundaries corresponds to N times the size of a maximum transport unit where N>1.

2. A method according to claim 1 wherein at least one slice boundary defining parameter is representative of at least one of:
   the characteristics of data content of the video sequence; and
   the capabilities of the decoder to which the encoded image is to be transmitted.

3. A method according to claim 1 wherein one slice boundary defining parameter is representative of the coding dependency of a coding unit on its neighbouring coding units in the image.

4. A method according to claim 1, wherein one slice boundary defining parameter representative of the characteristics of the network defines the packet loss rate, and wherein the number of coding units in a slice between two slice boundaries is increased if the packet loss rate falls below a predetermined threshold.

5. A method according to claim 1 wherein one slice boundary defining parameter is representative of an expected error resilience level and the compression rate of the bitstream representative of the image.

6. A method according to claim 2 wherein one slice boundary defining parameter representative of the capabilities of the decoder defines the number of decoding processes that can be run in parallel.

7. A method according to claim 2 wherein one slice boundary defining parameter representative of the capabilities of the decoder is the number of decoding processes that can be run in parallel for the same type of decoding process.

8. A method according to claim 2 wherein one slice boundary defining parameter representative of the capabilities of the decoder includes an error concealment capability of the decoder.

9. A method according to claim 8, wherein the slice boundaries for an encoding process comprising pixel reconstruction are defined such that the surface area of the image represented by the slice is inferior to a surface area depending on the error concealment capability of the decoder.

10. A method according to claim 2 wherein one slice boundary defining parameter representative of the characteristics of data content of the video sequence includes a level of spatial correlation of a coding unit of the image with neighbouring coding units of the image.

11. A method according to claim 10 wherein a slice boundary is introduced at a coding unit when said level of spatial correlation for said coding unit is less than a spatial correlation threshold.

12. A method according to claim 11 wherein said spatial correlation threshold corresponds to a predetermined number of bits used to predict motion information from a neighbouring coding unit.

13. A method according to claim 11 wherein said spatial correlation threshold corresponds to a predetermined filtering strength of the loop filters.

14. A method according to claim 11 wherein said spatial correlation threshold depends on an intra prediction mode used for encoding a coding unit.

15. A method according to claim 2 wherein one slice boundary defining parameter representative of the characteristics of data content of the video sequence is a level of prediction by the entropy context model defined in syntax coding parameters for the syntax coding process.

16. A method according to claim 15 wherein a slice boundary is introduced at a coding unit when said level prediction by the entropy context model defined in syntax coding parameters is less than a predetermined threshold.

17. A method according to claim 1 wherein at least two different sets of the slice boundaries are determined for at least one of the encoding process, one of the at least 2 sets of slice boundaries optimising a rate distortion minimisation criteria being selected.

18. A method of encoding an image of a video sequence, the image being represented by a plurality of coding units, the encoding comprising at least two different encoding processes for encoding the image wherein each encoding process introduces coding dependencies between coding units, the method comprising:
 determining slices for encoding of the image according to the method of claim 1; and
 encoding the determined slices according to the respective encoding process.

19. A non-transitory computer-readable storage medium storing instructions of a computer program for implementing a method of determining slices for encoding an image of a video sequence, according to claim 1.

20. A device for determining slices of an image for encoding an image of a video sequence, the image being represented by a plurality of coding units, the encoding comprising a first encoding process and a second encoding process for encoding the image wherein each encoding process introduces coding dependencies between coding units, the device comprising:
 slice boundary determining means for determining, for each encoding process, a respective set of slice boundaries wherein the set of slice boundaries for each encoding process partitions the image into one or more slices for the respective encoding process, the one or more slices each including a set of coding units of the image between a pair of respective slice boundaries; the coding units of one slice being codable independently of coding units of another of the slices of the respective encoding process;
 wherein the slice boundary determining means is operable to determine the slice boundaries for the first encoding process as a function of at least one slice boundary defining parameter independently from the slice boundaries for the second encoding process, the at least one slice boundary defining parameter being representative of at least one of characteristics of a network via which the encoded image is to be transmitted,
 wherein the at least one slice boundary defining parameter defines a size of a maximum transport unit of said network so that the size of a slice between two slice boundaries is determined in the following way:
  if the packet loss rate of the network is above a predetermined packet loss rate threshold, the slice boundaries are defined such that the size of a slice between two slice boundaries is less or equal to the size of a maximum transport unit; otherwise
  if the packet loss rate is less than the predetermined packet loss rate threshold, the slice boundaries are defined such that the size of a slice between two slice boundaries corresponds to N times the size of a maximum transport unit where N>1.

21. A device according to claim 20 wherein at least one slice boundary defining parameter is representative of at least one of:
 the characteristics of data content of the video sequence; and
 the capabilities of the decoder to, which the encoded image is to be transmitted.

22. A device according to claim 20 wherein the coding dependency comprises coding dependency between coding units and the slice boundary determining means is operable to define the slice boundaries according to the coding dependency of a coding unit on its neighbouring coding units in the image.

23. A device according to claim 20, wherein one slice boundary defining parameter representative of the characteristics of the network includes the packet loss rate, and wherein the slice boundary determining means is operable to increase the number of coding units in a slice between two slice boundaries if the packet loss rate falls below a predetermined threshold.

24. A device according to claim 20 wherein the slice boundary determining means is operable to define slice boundaries according to an error resilience level of the bitstream representative of the image.

25. A device according to claim 21 wherein one slice boundary defining parameter representative of the capabilities of the decoder is the number of decoding processes that can be run in parallel on the decoder.

26. A device according to claim 21 wherein one slice boundary defining parameter representative of the capabilities of the decoder is the number of decoding processes that can be run in parallel on the decoder for each encoding process.

27. A device according to claim 21 wherein one slice boundary defining parameter representative of the capabilities of the decoder includes an error concealment capability of the decoder.

28. A device according to claim 20 wherein the slice boundary determining means is operable to determine the slice boundaries for an encoding process comprising pixel reconstruction such that the surface area of the image represented by the slice is inferior to a surface area depending on the error concealment capability of the decoder.

29. A device according to claim 21 wherein one slice boundary defining parameter representative of the characteristics of data content of the video sequence includes a level of spatial correlation of a coding unit of the image with neighbouring coding units of the image.

30. A device according to claim 29 wherein the slice boundary determining means is operable to introduce a slice boundary at a coding unit when said level of spatial correlation for said coding unit is less than a spatial correlation threshold.

31. A device according to claim 30 wherein said spatial correlation threshold depends on a predetermined number of bits used to predict motion information from a neighbouring coding unit.

32. A device according to claim 30 wherein said spatial correlation threshold depends on a predetermined filtering strength of the loop filters.

33. A device according to claim 30 wherein said spatial correlation threshold depends on an intra prediction mode used for encoding a coding unit.

34. A device according to claim 21 wherein one slice boundary defining parameter representative of the characteristics of data content of the video sequence is a level of prediction by the entropy context model defined in syntax coding parameters for the syntax coding process.

35. A device according to claim 34 wherein the slice boundary determining means is operable to introduce a slice boundary at a coding unit when said level prediction by the entropy context model defined in syntax coding parameters is less than a predetermined threshold.

36. A device according to claim 20 wherein at least two different sets of the slice boundaries are determined for at least one of the encoding process, one of the at least 2 sets of slice boundaries optimising a rate distortion minimisation criteria being selected.

37. An encoding device for encoding an image of a video sequence, the image being represented by a plurality of coding units, the encoding device being operable to apply at least two different encoding processes for encoding the image wherein each encoding process introduces coding dependencies between coding units, the encoding device comprising:

a device for determining slices of an image for encoding the image, for each encoding process, a respective set of slice boundaries wherein the set of slice boundaries for each encoding process partitions the image into one or more slices for the respective encoding process, the one or more slices each including a set of coding units of the image between a pair of respective slice boundaries and the coding units of one slice being encoded independently of the coding units of another of the slices of the encoding process concerned; and an encoding unit for encoding the slices according to the respective encoding process, wherein the slice boundaries for a first encoding process are determined as a function of at least one slice boundary defining parameter independently from the slice boundaries for a second encoding process, the at least one slice boundary defining parameter being representative of at least one of characteristics of a network via which the encoded image is to be transmitted, wherein the at least one slice boundary defining parameter defines a size of a maximum transport unit of said network so that the size of a slice between two slice boundaries is determined in the following way:

if the packet loss rate of the network is above a predetermined packet loss rate threshold, the slice boundaries are defined such that the size of a slice between two slice boundaries is less or equal to the size of a maximum transport unit; otherwise if the packet loss rate is less than the predetermined packet loss rate threshold, the slice boundaries are defined such that the size of a slice between two slice boundaries corresponds to N times the size of a maximum transport unit where N>1.

38. A method of decoding a video bitstream representative of an image of a video sequence, the image being represented by a plurality of coding units and having been encoded according to the method of claim 1, the method comprising:

decoding the bitstream according to sets of slice boundaries wherein each set of slice boundaries corresponds to a different decoding process and comprises one or more slices including a set of coding units, wherein the coding units of one slice are decoded independently of coding units of another of the slices for the decoding process concerned.

39. A method according to claim 38 wherein at least two of the slices of a set of slices of a respective decoding process are decoded in parallel.

40. A method according to claim 38, wherein at least two of the independent decoding processes are performed in parallel.

41. A decoding device for decoding a video bitstream representative of an image of a video sequence, the image being represented by a plurality of coding units and having been encoded according to the method of claim 1, the decoding device comprising:

decoding means for decoding the bitstream according to sets of slice boundaries wherein each set of slice boundaries corresponds to a decoding process and comprises one or more slices including a set of coding units, wherein the decoding means is operable to independently decode coding units of one slice independently of coding units of another of the slices for the same decoding process.

42. A device according to claim 41 wherein the decoding means is operable to decode at least two of the slices of a set of slices of a respective decoding process in parallel.

43. A device according to claim 41, wherein the decoding means is operable to decode at least two of the independent decoding processes in parallel.

\* \* \* \* \*